US012616945B2

(12) United States Patent
Bollen et al.

(10) Patent No.: US 12,616,945 B2
(45) Date of Patent: May 5, 2026

(54) MIXING FUNNEL

(71) Applicant: SharkNinja Operating LLC, Needham, MA (US)

(72) Inventors: Nathan Louis Bollen, Boston, MA (US); Andrew David Zdeblick, Reading, MA (US); Jack Richardson, Yorkshire (GB); Andrew Terajewicz, Nashville, TN (US); Brandon J. Suleski, Cambridge, MA (US)

(73) Assignee: SharkNinja Operating LLC, Needham, MA (US)

( * ) Notice: Subject to any disclaimer, the term of this patent is extended or adjusted under 35 U.S.C. 154(b) by 28 days.

(21) Appl. No.: 18/677,069

(22) Filed: May 29, 2024

(65) Prior Publication Data

US 2024/0342668 A1 Oct. 17, 2024

Related U.S. Application Data

(62) Division of application No. 18/300,860, filed on Apr. 14, 2023, now Pat. No. 12,005,408.

(51) Int. Cl.
*B01F 25/42* (2022.01)
*B01F 23/451* (2022.01)
(Continued)

(52) U.S. Cl.
CPC ............ *B01F 25/42* (2022.01); *B01F 23/451* (2022.01); *B01F 25/31* (2022.01);
(Continued)

(58) Field of Classification Search
CPC ........ B01F 25/42; B67D 3/0012; B67C 11/02
(Continued)

(56) References Cited

U.S. PATENT DOCUMENTS 79,689 A * 7/1868 Rottanzi ................ B65D 25/04
222/145.5
866,122 A 9/1907 Foster
(Continued)

FOREIGN PATENT DOCUMENTS

CA 2649591 A1 9/2004
CA 142521 S 5/2012
(Continued)

OTHER PUBLICATIONS

Invitation to Pay Additional Fees received for PCT Application No. PCT/US2024/023703, mailed on Jul. 10, 2024, 11 pages.
U.S. Appl. No. 18/300,860, filed Apr. 14, 2023.

*Primary Examiner* — David L Sorkin
(74) *Attorney, Agent, or Firm* — Mintz, Levin, Cohn, Ferris, Glovsky and Popeo, P.C. US

(57) ABSTRACT

A mixing funnel for mixing fluids is provided. In one embodiment, the mixing funnel includes a tray having a fluid inlet arranged to receive a primary fluid flow, and first and second fluid passages configured to receive primary fluid flow from the fluid inlet such that the flow is divided to flow along the first and second fluid passages. The first and second fluid passages can be arranged to direct the primary fluid flow to a mixing area. The tray can further include a fluid outlet arranged to receive the primary fluid flow from the mixing area and to deliver the fluid to a container.

8 Claims, 10 Drawing Sheets

(51) Int. Cl.
*B01F 25/31* (2022.01)
*B01F 35/75* (2022.01)
*B67C 11/02* (2006.01)
*B67D 3/00* (2006.01)
*B01F 25/00* (2022.01)
*B01F 101/14* (2022.01)

(52) U.S. Cl.
CPC ........ *B01F 35/75415* (2022.01); *B67C 11/02* (2013.01); *B67D 3/0012* (2013.01); *B01F 2025/9321* (2022.01); *B01F 2101/14* (2022.01)

(58) Field of Classification Search
USPC ......................... 366/181.5; 222/145.5, 145.6
See application file for complete search history.

(56) References Cited

U.S. PATENT DOCUMENTS 1,242,493 A 10/1917 Stringham
1,293,003 A * 2/1919 Bergens .............. B01F 25/3131 4/677
1,420,773 A 6/1922 Stainbrook
2,511,291 A 6/1950 Mueller
2,556,038 A 6/1951 Paul
2,653,733 A 9/1953 Rudd et al.
4,121,507 A 10/1978 Kuckens
4,251,473 A 2/1981 Gilbey
4,261,481 A * 4/1981 Speer ...................... B05C 17/01 222/145.6
4,518,541 A 5/1985 Harris
4,752,138 A 6/1988 Rufer
4,866,324 A 9/1989 Yuzawa et al.
5,038,976 A 8/1991 McMillin
5,128,574 A 7/1992 Koizumi et al.
5,156,871 A 10/1992 Goulet et al.
5,329,975 A 7/1994 Heitel
6,095,677 A 8/2000 Karkos et al.
6,336,603 B1 1/2002 Karkos et al.
6,544,614 B1 4/2003 Huffer et al.
6,579,006 B1 6/2003 Pariseau
6,634,516 B2 10/2003 Carballido
6,652,893 B2 11/2003 Berson
6,672,481 B2 1/2004 Ziesel
6,712,497 B2 3/2004 Jersey et al.
6,832,706 B2 12/2004 Hearld et al.
6,866,164 B2 3/2005 Branson et al.
6,874,551 B1 4/2005 Snell et al.
6,896,159 B2 5/2005 Crisp et al.
6,915,925 B2 7/2005 Crisp et al.
6,945,289 B2 9/2005 Marszalec et al.
6,989,101 B2 1/2006 Cumberland et al.
7,051,888 B2 5/2006 Antier et al.
7,097,074 B2 8/2006 Halliday et al.
7,108,156 B2 9/2006 Fox
7,121,438 B2 10/2006 Hoepner et al.
7,134,575 B2 11/2006 Vogel et al.
7,150,829 B2 12/2006 Na et al.
7,156,247 B2 1/2007 Laburu
7,163,127 B2 1/2007 Seelhofer
7,163,192 B2 1/2007 Aoki et al.
7,165,695 B2 1/2007 Choi
7,213,506 B2 5/2007 Halliday et al.
7,219,598 B2 5/2007 Halliday et al.
7,231,869 B2 6/2007 Halliday et al.
7,255,039 B2 8/2007 Halliday et al.
7,287,461 B2 10/2007 Halliday et al.
7,288,276 B2 10/2007 Rona et al.
7,297,263 B2 11/2007 Nelson et al.
7,303,683 B2 12/2007 Cumberland
7,309,418 B2 12/2007 Joyce et al.
7,314,060 B2 * 1/2008 Chen ................... F16K 99/0021 366/337
7,316,178 B2 1/2008 Halliday et al.
7,322,277 B2 1/2008 Halliday et al.
7,328,815 B2 2/2008 Lowe
7,360,418 B2 4/2008 Pelovitz
7,378,015 B2 5/2008 Rinker et al.
D573,394 S 7/2008 Tullney et al.
D573,395 S 7/2008 Tullney et al.
7,418,899 B2 9/2008 Halliday et al.
7,445,133 B2 11/2008 Ludovissie et al.
7,455,769 B2 11/2008 Heitele
7,458,486 B2 12/2008 Weist et al.
7,461,584 B2 12/2008 Blanc et al.
D584,912 S 1/2009 Green et al.
D584,913 S 1/2009 Green et al.
D585,231 S 1/2009 Bulala et al.
D586,606 S 2/2009 Ma et al.
7,510,095 B2 3/2009 Comeau et al.
D590,475 S 4/2009 Bell et al.
7,513,192 B2 4/2009 Sullivan et al.
7,533,603 B2 5/2009 Halliday et al.
7,533,604 B2 5/2009 Halliday et al.
7,556,425 B2 7/2009 Gluck
D598,233 S 8/2009 Ma et al.
7,569,138 B2 8/2009 Moretto
7,578,415 B2 8/2009 Ziesel et al.
D600,498 S 9/2009 Ma et al.
7,592,027 B2 9/2009 Halliday et al.
7,607,385 B2 10/2009 Halliday et al.
7,617,954 B2 11/2009 Skillin
7,644,843 B1 1/2010 Bush et al.
7,648,049 B1 1/2010 Lassota
7,651,002 B2 1/2010 Hennemann et al.
7,673,558 B2 3/2010 Panesar et al.
7,678,282 B2 3/2010 Moretto
7,681,492 B2 3/2010 Suggi et al.
7,686,441 B2 3/2010 Hashii et al.
7,703,381 B2 4/2010 Liverani et al.
7,722,766 B2 5/2010 Namur
7,731,066 B2 6/2010 Norris et al.
7,731,161 B2 6/2010 Seiwert et al.
7,735,665 B2 6/2010 Robinson
7,762,438 B2 7/2010 Skillin
D623,545 S 9/2010 Tullney et al.
7,789,273 B2 9/2010 Kadyk et al.
7,806,294 B2 10/2010 Gatipon et al.
D626,777 S 11/2010 Bell et al.
D626,778 S 11/2010 Bell et al.
D626,779 S 11/2010 Bell et al.
7,857,910 B2 12/2010 Carhuff et al.
D632,520 S 2/2011 Bell et al.
7,896,168 B2 3/2011 Collias et al.
D636,631 S 4/2011 Muddana et al.
7,918,436 B2 4/2011 Hara
7,947,619 B2 5/2011 Harvey
7,959,872 B2 6/2011 Namespetra et al.
D642,068 S 7/2011 Milewski et al.
7,975,883 B2 7/2011 Laib et al.
7,975,988 B2 7/2011 Thomson et al.
D642,657 S 8/2011 Cumberland et al.
D642,658 S 8/2011 Cumberland et al.
D643,090 S 8/2011 Cumberland et al.
7,987,770 B2 8/2011 Klump et al.
8,006,853 B2 8/2011 Delage
8,006,866 B2 8/2011 Minard et al.
8,051,999 B2 11/2011 Carmody et al.
8,052,257 B2 11/2011 Gonzales
8,083,100 B2 12/2011 Minard et al.
8,087,347 B2 1/2012 Halliday et al.
8,114,284 B2 2/2012 Walde et al.
8,119,012 B2 2/2012 Bahm et al.
D656,823 S 4/2012 Kriegel
D657,194 S 4/2012 McIntire et al.
8,153,002 B2 4/2012 Namur
D660,731 S 5/2012 Milewski et al.
8,167,141 B2 5/2012 Knipmeyer et al.
8,172,453 B2 5/2012 Boussemart et al.
8,210,736 B2 7/2012 Raber
8,216,451 B2 7/2012 Walde et al.
8,216,465 B2 7/2012 Nauta
8,250,972 B2 8/2012 Santoiemmo
8,268,770 B2 9/2012 Privitera et al.

(56) References Cited

U.S. PATENT DOCUMENTS 8,282,268 B2 10/2012 Karkos et al.
8,286,815 B2 10/2012 Thierjung et al.
8,292,101 B1 10/2012 Bragg et al.
8,298,408 B2 10/2012 Moretto
8,317,050 B2 11/2012 Hollis et al.
D672,187 S 12/2012 Milewski et al.
D676,766 S 2/2013 Nishijima et al.
8,371,452 B2 2/2013 Swain et al.
8,376,147 B2 2/2013 Reder et al.
8,376,182 B2 2/2013 Lepage
8,381,925 B2 2/2013 Skillin et al.
8,403,179 B1 3/2013 Gerber
D680,789 S 4/2013 Bell et al.
D680,790 S 4/2013 Bell et al.
D680,791 S 4/2013 Bell et al.
8,424,775 B2 4/2013 Mizukoshi et al.
8,430,134 B2 4/2013 Gill
8,434,639 B2 5/2013 Markert
8,448,804 B2 5/2013 Luburic
D684,009 S 6/2013 Bell et al.
8,454,826 B2 6/2013 Donnelly et al.
D685,606 S 7/2013 Keys et al.
D686,693 S 7/2013 Schaub et al.
8,480,882 B2 7/2013 Cueman et al.
8,480,979 B2 7/2013 Rinker et al.
8,500,895 B2 8/2013 Blank et al.
8,517,212 B2 8/2013 Antal, Sr.
8,523,025 B2 9/2013 Skillin et al.
8,524,078 B2 9/2013 Wawrla et al.
D691,420 S 10/2013 Mclntire
8,544,692 B2 10/2013 Rusch et al.
8,555,774 B2 10/2013 Patera et al.
8,584,578 B2 11/2013 Koopman et al.
8,596,863 B2 12/2013 Lescanec et al.
8,616,412 B2 12/2013 Bethuy et al.
8,621,990 B2 1/2014 Fang et al.
8,623,206 B2 1/2014 Wilder et al.
8,631,963 B2 1/2014 Lane et al.
8,641,018 B2 2/2014 Sonnenrein
8,647,567 B2 2/2014 Rumberger et al.
8,647,735 B2 2/2014 Le Bris et al.
8,651,333 B2 2/2014 Metropulos et al.
8,661,966 B2 3/2014 Stearns et al.
8,668,376 B2 3/2014 Krauchi et al.
8,677,888 B2 3/2014 Santoiemmo
8,685,477 B2 4/2014 Almblad et al.
8,690,026 B2 4/2014 Richards et al.
8,722,575 B2 5/2014 Masciambruni
8,727,515 B2 5/2014 Dowell et al.
8,733,566 B2 5/2014 Druitt et al.
8,754,006 B2 6/2014 Masciambruni
8,757,227 B2 6/2014 Girard et al.
8,757,452 B2 6/2014 Richards et al.
8,770,094 B2 7/2014 Rithener et al.
8,794,126 B2 8/2014 Skalski et al.
8,807,392 B2 8/2014 Smeller et al.
8,807,824 B2 8/2014 Bodum
8,820,577 B2 9/2014 Rusch et al.
8,826,688 B2 9/2014 Tachibana et al.
8,833,241 B2 9/2014 Santoiemmo
8,833,584 B2 9/2014 Groubert
8,833,586 B2 9/2014 Meyers et al.
8,840,092 B2 9/2014 Kumar et al.
8,844,555 B2 9/2014 Schneider
8,844,747 B2 9/2014 Petti
8,846,121 B2 9/2014 Hansen et al.
8,863,987 B2 10/2014 Jacobs et al.
8,863,991 B2 10/2014 Cleary et al.
8,869,824 B2 10/2014 Arov
D716,604 S 11/2014 Keys et al.
8,887,958 B2 11/2014 Kadyk et al.
8,889,203 B2 11/2014 York
8,916,215 B2 12/2014 Yoakim et al.
8,919,240 B2 12/2014 Ozanne et al.
8,960,500 B2 2/2015 Van Opstal et al.
8,960,506 B2 2/2015 Beilke et al.
8,961,781 B2 2/2015 Ma et al.
D724,384 S 3/2015 Donovan et al.
8,992,781 B2 3/2015 Daniely et al.
8,993,018 B2 3/2015 Bucher et al.
D726,488 S 4/2015 Wittke et al.
8,998,035 B2 4/2015 Ford
8,999,477 B2 4/2015 Hirth
9,010,237 B2 4/2015 Ozanne et al.
D728,298 S 5/2015 Ma et al.
D728,317 S 5/2015 Ma et al.
D728,318 S 5/2015 Ma et al.
D728,735 S 5/2015 Zller
D729,344 S 5/2015 Colussi
9,023,205 B2 5/2015 Namur
9,026,245 B2 5/2015 Tilton et al.
9,027,466 B2 5/2015 Bucher et al.
9,028,690 B2 5/2015 Sanocki et al.
D731,240 S 6/2015 Bell et al.
D732,892 S 6/2015 Keys et al.
9,044,718 B2 6/2015 Ludwig et al.
9,045,353 B2 6/2015 Parekh et al.
9,045,722 B2 6/2015 Reif et al.
9,049,951 B2 6/2015 Keys et al.
9,051,162 B2 6/2015 Peters et al.
9,056,287 B2 6/2015 Peltola et al.
9,060,650 B2 6/2015 De Longhi
9,066,613 B2 6/2015 Kelly
9,073,673 B2 7/2015 Mazurkiewicz et al.
9,084,510 B2 7/2015 Scorrano et al.
9,084,952 B2 7/2015 Namur
9,090,483 B2 7/2015 Rajan et al.
D736,562 S 8/2015 Green et al.
D736,622 S 8/2015 Nishijima et al.
9,107,448 B2 8/2015 Giardino et al.
9,107,449 B2 8/2015 Njaastad et al.
9,107,533 B2 8/2015 Volz et al.
9,132,369 B2 9/2015 Bell et al.
9,145,243 B2 9/2015 Kim et al.
D741,176 S 10/2015 Bell et al.
9,150,400 B2 10/2015 Kuehl et al.
9,155,330 B1 10/2015 Shtivelman
9,155,418 B2 10/2015 Lai et al.
9,161,654 B2 10/2015 Belmont
9,166,448 B2 10/2015 Lam et al.
9,167,935 B2 10/2015 Scholvinck et al.
9,169,048 B2 10/2015 Ludewigs et al.
D744,781 S 12/2015 Rummel et al.
9,227,367 B2 1/2016 Festner et al.
9,233,824 B2 1/2016 Alan et al.
9,248,391 B2 2/2016 Bommi et al.
D750,428 S 3/2016 Keys et al.
9,282,836 B2 3/2016 Nishijima et al.
9,290,317 B2 3/2016 Quinn et al.
9,295,278 B2 3/2016 Nowak
9,301,640 B2 4/2016 Talon et al.
9,302,229 B2 4/2016 Leung et al.
9,320,382 B2 4/2016 Lo Faro et al.
9,320,385 B2 4/2016 Spiegel et al.
9,334,090 B1 5/2016 Maple et al.
9,345,270 B2 5/2016 Owen et al.
9,351,604 B2 5/2016 Talon et al.
9,364,018 B1 6/2016 Peterson et al.
9,371,176 B2 6/2016 Kohli et al.
9,375,686 B2 6/2016 Boarman et al.
D762,085 S 7/2016 McDonald et al.
9,388,033 B2 7/2016 Gates
D762,411 S 8/2016 McDonald et al.
D762,413 S 8/2016 McDonald et al.
D762,414 S 8/2016 McDonald et al.
D763,037 S 8/2016 McDonald et al.
D764,312 S 8/2016 Nishijima et al.
9,409,680 B2 8/2016 Van Alfen et al.
9,409,757 B2 8/2016 Reddy
9,409,758 B2 8/2016 Mchale et al.
9,409,759 B2 8/2016 Wilder et al.
9,412,062 B2 8/2016 Pachler et al.
D765,467 S 9/2016 McDonald et al.
9,433,317 B2 9/2016 Agon et al.

(56) References Cited

U.S. PATENT DOCUMENTS

| | | | |
|---|---|---|---|
| 9,434,532 | B2 | 9/2016 | Yoakim et al. |
| 9,436,851 | B1 | 9/2016 | Ganor et al. |
| 9,440,836 | B2 | 9/2016 | Quittner et al. |
| 9,445,688 | B2 | 9/2016 | Flick |
| 9,464,944 | B2 | 10/2016 | Ortais |
| 9,469,463 | B2 | 10/2016 | Murray et al. |
| 9,481,508 | B2 | 11/2016 | Oh |
| 9,486,102 | B2 | 11/2016 | Baldo |
| 9,492,796 | B2 | 11/2016 | An et al. |
| 9,504,348 | B2 | 11/2016 | Windler et al. |
| 9,505,510 | B2 | 11/2016 | Hatherell |
| 9,516,969 | B2 | 12/2016 | Weflen |
| 9,521,924 | B2 | 12/2016 | Priley et al. |
| 9,527,047 | B2 | 12/2016 | Ring et al. |
| 9,538,876 | B2 | 1/2017 | Ozanne et al. |
| D779,046 | S | 2/2017 | Tansey, Jr. |
| 9,580,216 | B2 | 2/2017 | Wisniewski |
| 9,582,699 | B2 | 2/2017 | Jarisch et al. |
| 9,593,005 | B2 | 3/2017 | Jersey et al. |
| 9,630,157 | B2 | 4/2017 | Li et al. |
| 9,630,770 | B2 | 4/2017 | Roberts et al. |
| 9,651,188 | B2 | 5/2017 | Green et al. |
| 9,656,193 | B2 | 5/2017 | Lee |
| 9,661,951 | B2 | 5/2017 | Bugnano et al. |
| 9,664,264 | B2 | 5/2017 | Kristlbauer |
| D789,135 | S | 6/2017 | Green |
| D789,727 | S | 6/2017 | Rummel et al. |
| 9,668,604 | B2 | 6/2017 | Yoakim et al. |
| 9,668,608 | B2 | 6/2017 | Mori et al. |
| 9,669,973 | B2 | 6/2017 | Hoshino et al. |
| 9,687,796 | B2 | 6/2017 | Hoare et al. |
| D792,941 | S | 7/2017 | Rummel et al. |
| 9,702,616 | B2 | 7/2017 | Kim et al. |
| 9,708,109 | B2 | 7/2017 | Marina et al. |
| 9,714,162 | B2 | 7/2017 | Hecht et al. |
| D793,165 | S | 8/2017 | Rummel et al. |
| 9,717,366 | B2 | 8/2017 | Nevin et al. |
| 9,718,035 | B2 | 8/2017 | Bandixen et al. |
| 9,723,863 | B2 | 8/2017 | Njaastad et al. |
| 9,730,547 | B2 | 8/2017 | Tanner et al. |
| 9,743,801 | B2 | 8/2017 | Leuzinger et al. |
| 9,745,120 | B2 | 8/2017 | Abegglen et al. |
| 9,745,185 | B2 | 8/2017 | Klopfenstein et al. |
| D796,245 | S | 9/2017 | Plihal |
| 9,751,054 | B2 | 9/2017 | Jin et al. |
| 9,754,437 | B2 | 9/2017 | Deo et al. |
| 9,770,129 | B2 | 9/2017 | Remo et al. |
| D799,899 | S | 10/2017 | Rummel et al. |
| D800,489 | S | 10/2017 | Rummel et al. |
| 9,783,405 | B2 | 10/2017 | Olson et al. |
| 9,788,681 | B2 | 10/2017 | Perentes et al. |
| 9,789,427 | B2 | 10/2017 | Freystedt et al. |
| 9,789,449 | B2 | 10/2017 | Kyong et al. |
| 9,795,245 | B2 | 10/2017 | Mulvaney et al. |
| 9,796,506 | B2 | 10/2017 | Meager |
| 9,808,751 | B2 | 11/2017 | Moon et al. |
| 9,810,375 | B2 | 11/2017 | Rider et al. |
| 9,811,704 | B2 | 11/2017 | Kaeser |
| 9,816,751 | B2 | 11/2017 | Mackey et al. |
| 9,821,951 | B2 | 11/2017 | Estabrook et al. |
| 9,821,992 | B2 | 11/2017 | Rudick et al. |
| D806,466 | S | 1/2018 | Deacon |
| D808,212 | S | 1/2018 | Deacon |
| 9,854,935 | B2 | 1/2018 | Danieli et al. |
| 9,855,529 | B2 | 1/2018 | Brummer |
| 9,868,564 | B2 | 1/2018 | McGirr et al. |
| 9,884,776 | B2 | 2/2018 | Cagnoni |
| 9,889,414 | B2 | 2/2018 | Kang et al. |
| 9,896,322 | B2 | 2/2018 | Hecht |
| 9,897,220 | B2 | 2/2018 | Cohen et al. |
| D811,832 | S | 3/2018 | Rummel et al. |
| 9,907,425 | B2 | 3/2018 | Rivera |
| 9,907,432 | B2 | 3/2018 | Tanner et al. |
| 9,918,586 | B2 | 3/2018 | Smith et al. |
| D815,482 | S | 4/2018 | Bell et al. |
| D815,714 | S | 4/2018 | Bell et al. |
| 9,932,248 | B2 | 4/2018 | Johann et al. |
| 9,932,249 | B2 | 4/2018 | Johann et al. |
| 9,933,203 | B2 | 4/2018 | An et al. |
| 9,945,603 | B2 | 4/2018 | Hwang et al. |
| D818,824 | S | 5/2018 | Balander et al. |
| 9,955,710 | B2 | 5/2018 | Hyde et al. |
| 9,957,145 | B2 | 5/2018 | Cohen et al. |
| 9,974,410 | B2 | 5/2018 | Ferrier |
| 9,980,596 | B2 | 5/2018 | Rognon et al. |
| 9,981,801 | B2 | 5/2018 | Ozanne et al. |
| 9,994,459 | B2 | 6/2018 | Kellam et al. |
| 9,999,315 | B2 | 6/2018 | Crarer et al. |
| 9,999,316 | B2 | 6/2018 | Ye et al. |
| 10,000,370 | B2 | 6/2018 | Bethuy et al. |
| 10,005,658 | B2 | 6/2018 | Lee |
| 10,007,397 | B2 | 6/2018 | Besson et al. |
| 10,016,086 | B2 | 7/2018 | Castleberry |
| 10,017,372 | B2 | 7/2018 | Bethuy et al. |
| 10,022,011 | B2 | 7/2018 | Norton et al. |
| 10,023,476 | B2 | 7/2018 | Takeda et al. |
| 10,028,614 | B2 | 7/2018 | Perentes et al. |
| 10,034,573 | B2 | 7/2018 | Flick et al. |
| D827,086 | S | 8/2018 | Bell et al. |
| 10,046,981 | B2 | 8/2018 | Wilder et al. |
| 10,053,377 | B2 | 8/2018 | Ono |
| 10,058,826 | B2 | 8/2018 | Cohen et al. |
| D827,364 | S | 9/2018 | Rummel et al. |
| D827,770 | S | 9/2018 | Brill |
| 10,064,513 | B2 | 9/2018 | Rehfuss |
| 10,070,751 | B2 | 9/2018 | Magniet et al. |
| 10,071,363 | B2 | 9/2018 | Jenkins et al. |
| 10,076,208 | B2 | 9/2018 | Castellani et al. |
| 10,080,461 | B2 | 9/2018 | Bugnano et al. |
| 10,093,530 | B2 | 10/2018 | Mackey et al. |
| 10,099,942 | B2 | 10/2018 | Kellam et al. |
| 10,106,392 | B2 | 10/2018 | Peirsman et al. |
| D833,795 | S | 11/2018 | Bell et al. |
| 10,117,539 | B2 | 11/2018 | Rognon et al. |
| 10,117,540 | B2 | 11/2018 | De Vreede et al. |
| 10,118,841 | B2 | 11/2018 | Johann et al. |
| 10,130,211 | B2 | 11/2018 | Bugnano et al. |
| 10,131,528 | B2 | 11/2018 | Webster et al. |
| 10,131,529 | B2 | 11/2018 | Jersey et al. |
| 10,136,755 | B2 | 11/2018 | Talon |
| 10,143,949 | B2 | 12/2018 | Taszarek et al. |
| 10,143,978 | B2 | 12/2018 | Tipton |
| 10,149,569 | B2 | 12/2018 | Preshel |
| 10,155,647 | B2 | 12/2018 | Foster et al. |
| 10,159,376 | B2 | 12/2018 | Dovat et al. |
| 10,160,575 | B2 | 12/2018 | Ray |
| 10,165,892 | B2 | 1/2019 | Lafosse |
| 10,167,204 | B2 | 1/2019 | Utsch et al. |
| 10,173,492 | B2 | 1/2019 | Quest |
| 10,178,921 | B1 | 1/2019 | Rinker et al. |
| 10,189,720 | B2 | 1/2019 | Ishikawa et al. |
| 10,190,817 | B2 | 1/2019 | An et al. |
| 10,193,411 | B2 | 1/2019 | Tajima et al. |
| 10,201,171 | B2 | 2/2019 | Gordon et al. |
| 10,201,785 | B2 | 2/2019 | Cohen et al. |
| 10,206,533 | B2 | 2/2019 | Pirone |
| 10,211,438 | B2 | 2/2019 | Ohashi et al. |
| 10,213,033 | B2 | 2/2019 | Bratsch et al. |
| 10,213,752 | B2 | 2/2019 | Shalev |
| 10,214,018 | B2 | 2/2019 | Nozawa et al. |
| D843,168 | S | 3/2019 | Donovan et al. |
| 10,227,226 | B2 | 3/2019 | Jersey et al. |
| 10,229,401 | B2 | 3/2019 | Yoakim |
| 10,231,569 | B2 | 3/2019 | Perentes et al. |
| 10,233,002 | B2 | 3/2019 | Baenninger et al. |
| 10,239,669 | B2 | 3/2019 | Ayriss et al. |
| D845,693 | S | 4/2019 | Rummel et al. |
| D845,701 | S | 4/2019 | Rummel et al. |
| D846,939 | S | 4/2019 | Rummel et al. |
| 10,258,186 | B2 | 4/2019 | Rivera |
| 10,258,278 | B2 | 4/2019 | Howell et al. |
| 10,273,054 | B2 | 4/2019 | Li et al. |
| 10,280,060 | B2 | 5/2019 | Van Opstal et al. |
| 10,280,061 | B2 | 5/2019 | Ko et al. |

(56) References Cited

U.S. PATENT DOCUMENTS

| | | | |
|---|---|---|---|
| 10,294,020 | B2 | 5/2019 | Nordqvist et al. |
| 10,302,508 | B2 | 5/2019 | Ribi |
| D850,193 | S | 6/2019 | Bell et al. |
| D850,194 | S | 6/2019 | Bell et al. |
| 10,307,718 | B2 | 6/2019 | Waisman |
| 10,322,944 | B1 | 6/2019 | Shotey et al. |
| 10,323,989 | B2 | 6/2019 | Ribi |
| 10,328,362 | B2 | 6/2019 | Chang et al. |
| 10,328,367 | B2 | 6/2019 | Howie |
| 10,329,061 | B2 | 6/2019 | Dias et al. |
| 10,329,134 | B2 | 6/2019 | Olson et al. |
| 10,330,379 | B2 | 6/2019 | Kim et al. |
| 10,336,597 | B2 | 7/2019 | Griscik et al. |
| 10,336,627 | B2 | 7/2019 | Poindexter |
| 10,336,629 | B2 | 7/2019 | Mitchell |
| 10,343,885 | B2 | 7/2019 | Novak et al. |
| 10,349,773 | B2 | 7/2019 | Segiet et al. |
| 10,350,561 | B1 | 7/2019 | Dushine et al. |
| 10,358,269 | B2 | 7/2019 | Cerveny |
| 10,364,089 | B2 | 7/2019 | Daniels et al. |
| D857,446 | S | 8/2019 | Bell et al. |
| D857,456 | S | 8/2019 | Bell et al. |
| 10,370,235 | B2 | 8/2019 | Pellaud |
| 10,370,259 | B2 | 8/2019 | Bachand |
| 10,377,540 | B2 | 8/2019 | Borgardt et al. |
| 10,383,476 | B2 | 8/2019 | Alexander et al. |
| 10,384,839 | B2 | 8/2019 | Yamaguchi |
| D859,078 | S | 9/2019 | Rummel et al. |
| D859,080 | S | 9/2019 | Rummel et al. |
| D859,905 | S | 9/2019 | Morse |
| 10,398,254 | B2 | 9/2019 | Tinkler et al. |
| 10,399,769 | B2 | 9/2019 | Talon et al. |
| 10,399,838 | B2 | 9/2019 | Green |
| 10,399,839 | B2 | 9/2019 | Knoll et al. |
| 10,401,019 | B2 | 9/2019 | Xia et al. |
| 10,405,690 | B2 | 9/2019 | Tentorio |
| 10,405,691 | B2 | 9/2019 | Hesselbrock et al. |
| 10,406,488 | B2 | 9/2019 | Song et al. |
| 10,413,872 | B2 | 9/2019 | Thangamuthu et al. |
| 10,414,557 | B2 | 9/2019 | Skillin et al. |
| 10,414,642 | B2 | 9/2019 | Melville, Jr. et al. |
| 10,427,951 | B2 | 10/2019 | Dani et al. |
| 10,433,668 | B2 | 10/2019 | Merali et al. |
| 10,433,671 | B2 | 10/2019 | Surface |
| 10,435,313 | B2 | 10/2019 | Kellam et al. |
| 10,442,591 | B2 | 10/2019 | Rognard et al. |
| 10,455,968 | B1 | 10/2019 | Singer |
| 10,455,973 | B2 | 10/2019 | Dollner et al. |
| 10,455,974 | B2 | 10/2019 | Talon |
| 10,455,975 | B2 | 10/2019 | Saunders |
| 10,456,757 | B1 | 10/2019 | Blichmann |
| 10,457,450 | B2 | 10/2019 | Rios |
| 10,464,026 | B2 | 11/2019 | Armstrong et al. |
| 10,470,605 | B2 | 11/2019 | Ergican et al. |
| 10,470,606 | B2 | 11/2019 | Yoakim et al. |
| 10,473,385 | B2 | 11/2019 | Lee et al. |
| 10,479,668 | B2 | 11/2019 | Bulunmaz |
| 10,479,669 | B2 | 11/2019 | Kim et al. |
| 10,485,374 | B2 | 11/2019 | Lo Faro et al. |
| 10,486,953 | B2 | 11/2019 | Pellaud et al. |
| 10,488,097 | B2 | 11/2019 | Nachawati et al. |
| 10,494,246 | B2 | 12/2019 | Hecht et al. |
| 10,499,762 | B2 | 12/2019 | Gordon et al. |
| 10,501,242 | B2 | 12/2019 | Licari |
| 10,506,896 | B2 | 12/2019 | Ven Der Woning |
| 10,513,424 | B2 | 12/2019 | Tansey, Jr. |
| 10,518,938 | B2 | 12/2019 | Suzuki et al. |
| 10,518,942 | B2 | 12/2019 | Seibert et al. |
| 10,519,020 | B2 | 12/2019 | Ozawa et al. |
| 10,524,617 | B2 | 1/2020 | Perrin et al. |
| 10,526,186 | B2 | 1/2020 | Kuboi et al. |
| 10,537,200 | B2 | 1/2020 | Ait Bouziad et al. |
| 10,543,977 | B2 | 1/2020 | Brockman et al. |
| 10,548,430 | B2 | 2/2020 | Guard et al. |
| 10,555,636 | B2 | 2/2020 | Carr et al. |
| 10,556,807 | B2 | 2/2020 | Hierro |
| 10,556,808 | B2 | 2/2020 | Gilbert et al. |
| 10,562,700 | B2 | 2/2020 | Weijers et al. |
| 10,568,452 | B2 | 2/2020 | Fin et al. |
| 10,571,936 | B2 | 2/2020 | Zöller |
| D877,096 | S | 3/2020 | Stiehl |
| 10,595,670 | B2 | 3/2020 | Lagouche et al. |
| 10,604,310 | B2 | 3/2020 | Kutsuzawa et al. |
| 10,604,398 | B2 | 3/2020 | Smeller et al. |
| 10,604,422 | B2 | 3/2020 | Benzerrouk |
| D881,336 | S | 4/2020 | Dani et al. |
| 10,631,686 | B2 | 4/2020 | Abdo et al. |
| 10,643,502 | B2 | 5/2020 | Eliuk |
| 10,647,564 | B2 | 5/2020 | Showalter |
| 10,647,592 | B2 | 5/2020 | Geelhood et al. |
| 10,667,646 | B2 | 6/2020 | De Graaff et al. |
| 10,669,163 | B2 | 6/2020 | Swain et al. |
| 10,674,857 | B2 | 6/2020 | Lyons et al. |
| 10,674,863 | B2 | 6/2020 | Sevcik et al. |
| 10,676,336 | B2 | 6/2020 | Makino et al. |
| 10,682,007 | B2 | 6/2020 | Fischer |
| 10,702,835 | B2 | 7/2020 | Tran et al. |
| 10,702,838 | B2 | 7/2020 | Chaussin et al. |
| 10,703,618 | B2 | 7/2020 | Ziesel |
| 10,707,734 | B2 | 7/2020 | Holenstein et al. |
| 10,710,031 | B2 | 7/2020 | Rudick |
| 10,717,567 | B2 | 7/2020 | Sakamoto et al. |
| 10,717,637 | B2 | 7/2020 | Pellaud et al. |
| D892,273 | S | 8/2020 | Rummel et al. |
| 10,729,276 | B2 | 8/2020 | Bentley et al. |
| 10,740,583 | B2 | 8/2020 | Noth |
| 10,743,707 | B2 | 8/2020 | Bugnano et al. |
| 10,750,901 | B2 | 8/2020 | Hansen et al. |
| 10,754,427 | B2 | 8/2020 | Kolar et al. |
| 10,759,594 | B2 | 9/2020 | Mills et al. |
| 10,759,674 | B2 | 9/2020 | Deangelo et al. |
| 10,765,254 | B2 | 9/2020 | Totti et al. |
| 10,766,756 | B2 | 9/2020 | Gatipon et al. |
| 10,772,460 | B2 | 9/2020 | Accursi |
| 10,780,408 | B2 | 9/2020 | Schöb et al. |
| 10,787,371 | B2 | 9/2020 | Arah |
| 10,791,752 | B2 | 10/2020 | Siegel et al. |
| 10,793,346 | B2 | 10/2020 | Bartoli et al. |
| 10,800,581 | B2 | 10/2020 | Berroa Garcia |
| 10,807,049 | B2 | 10/2020 | Abdo et al. |
| 10,810,391 | B2 | 10/2020 | Noth et al. |
| 10,813,501 | B2 | 10/2020 | Helf et al. |
| 10,815,038 | B2 | 10/2020 | Rehders |
| 10,815,141 | B2 | 10/2020 | Timmons et al. |
| D900,526 | S | 11/2020 | Rummel et al. |
| 10,820,741 | B2 | 11/2020 | Byun et al. |
| 10,820,744 | B2 | 11/2020 | Rubin et al. |
| 10,820,745 | B2 | 11/2020 | Zwicker et al. |
| 10,820,746 | B2 | 11/2020 | Noth |
| 10,821,762 | B2 | 11/2020 | Hohberger et al. |
| 10,822,249 | B2 | 11/2020 | McDonald et al. |
| 10,827,863 | B2 | 11/2020 | Brown et al. |
| 10,827,875 | B2 | 11/2020 | Noth |
| 10,828,586 | B2 | 11/2020 | Simpson et al. |
| 10,842,313 | B2 | 11/2020 | Novak et al. |
| 10,843,142 | B2 | 11/2020 | Waggoner et al. |
| 10,843,849 | B1 | 11/2020 | Berge |
| 10,843,866 | B2 | 11/2020 | Cafaro et al. |
| 10,847,054 | B2 | 11/2020 | Minvielle |
| 10,849,451 | B2 | 12/2020 | Su |
| 10,849,454 | B2 | 12/2020 | Gordon et al. |
| 10,850,966 | B2 | 12/2020 | Lahey et al. |
| 10,857,248 | B2 | 12/2020 | Hanano |
| 10,859,177 | B2 | 12/2020 | Kuzuya |
| 10,863,851 | B1 | 12/2020 | Ganahl |
| 10,865,125 | B2 | 12/2020 | Zöller |
| 10,869,572 | B2 | 12/2020 | Blatt |
| 10,870,566 | B2 | 12/2020 | Green et al. |
| 10,882,728 | B2 | 1/2021 | Hong et al. |
| 10,883,072 | B2 | 1/2021 | Hong et al. |
| 10,888,825 | B2 | 1/2021 | Jeong et al. |
| 10,893,773 | B2 | 1/2021 | Standaar et al. |
| 10,894,639 | B2 | 1/2021 | Pruiett |
| 10,894,706 | B2 | 1/2021 | Totti et al. |

(56) References Cited

U.S. PATENT DOCUMENTS

| | | | |
|---|---|---|---|
| 10,899,501 | B2 | 1/2021 | Key |
| 10,899,645 | B2 | 1/2021 | Trojan-Heitele et al. |
| 10,900,845 | B2 | 1/2021 | Park et al. |
| D910,581 | S | 2/2021 | Rummel et al. |
| 10,905,287 | B2 | 2/2021 | Tu et al. |
| 10,906,013 | B2 | 2/2021 | Cohen et al. |
| 10,919,752 | B2 | 2/2021 | Breault |
| 10,919,780 | B2 | 2/2021 | Anderson |
| 10,920,114 | B2 | 2/2021 | Wild et al. |
| 10,925,433 | B2 | 2/2021 | Hansen et al. |
| 10,926,945 | B2 | 2/2021 | Kennedy et al. |
| 10,940,494 | B2 | 3/2021 | Romanov et al. |
| 10,945,554 | B2 | 3/2021 | Lo Faro et al. |
| 10,945,557 | B2 | 3/2021 | Nishimura et al. |
| 10,947,485 | B2 | 3/2021 | Min et al. |
| 10,952,562 | B2 | 3/2021 | Tanner et al. |
| 10,954,043 | B2 | 3/2021 | Taruno |
| 10,966,563 | B2 | 4/2021 | Dubief et al. |
| 10,966,564 | B2 | 4/2021 | Rijskamp et al. |
| 10,973,364 | B2 | 4/2021 | Hesselbrock et al. |
| 10,980,369 | B2 | 4/2021 | Glucksman |
| 10,981,093 | B2 | 4/2021 | Shotey et al. |
| 10,981,123 | B2 | 4/2021 | Park |
| 10,981,700 | B2 | 4/2021 | Migas et al. |
| 10,988,364 | B2 | 4/2021 | Bamford |
| 10,993,575 | B2 | 5/2021 | Krug et al. |
| 10,993,576 | B2 | 5/2021 | Fedorak et al. |
| 10,994,980 | B2 | 5/2021 | Jangbarwala et al. |
| 11,008,206 | B2 | 5/2021 | Pappas |
| 11,008,225 | B2 | 5/2021 | Zou |
| 11,008,229 | B1 | 5/2021 | Hartmann et al. |
| 11,013,353 | B2 | 5/2021 | Hambrock et al. |
| 11,013,363 | B1 | 5/2021 | Alsudairi et al. |
| 11,021,359 | B2 | 6/2021 | Bissen et al. |
| 11,026,539 | B2 | 6/2021 | Zosimadis et al. |
| 11,026,540 | B2 | 6/2021 | Mathure et al. |
| 11,027,228 | B1 | 6/2021 | Zou |
| 11,033,841 | B1 | 6/2021 | Shotey et al. |
| 11,039,712 | B2 | 6/2021 | Egli et al. |
| 11,040,806 | B2 | 6/2021 | Naumann et al. |
| 11,045,751 | B2 | 6/2021 | Dani et al. |
| 11,049,354 | B2 | 6/2021 | Yoakim |
| 11,051,649 | B2 | 7/2021 | Anthony et al. |
| 11,053,053 | B2 | 7/2021 | Jordan |
| 11,053,137 | B1 | 7/2021 | Knopke et al. |
| 11,059,636 | B2 | 7/2021 | Maeda |
| 11,060,714 | B2 | 7/2021 | Mattice |
| 11,060,924 | B2 | 7/2021 | Nemet |
| 11,062,823 | B2 | 7/2021 | Tsai |
| 11,064,715 | B2 | 7/2021 | Herbert et al. |
| 11,066,311 | B2 | 7/2021 | Dani et al. |
| 11,072,521 | B2 | 7/2021 | Walker |
| 11,078,066 | B2 | 8/2021 | Crackel et al. |
| 11,084,007 | B2 | 8/2021 | Adams |
| 11,084,701 | B2 | 8/2021 | Kuboi et al. |
| 11,085,435 | B2 | 8/2021 | Dobbins et al. |
| 11,089,891 | B2 | 8/2021 | Alexander |
| 11,090,588 | B2 | 8/2021 | Sharma et al. |
| 11,096,517 | B2 | 8/2021 | Spijker et al. |
| 11,097,236 | B2 | 8/2021 | Alexander et al. |
| 11,109,708 | B2 | 9/2021 | Lecomte et al. |
| 11,110,418 | B2 | 9/2021 | Furman et al. |
| 11,129,490 | B2 | 9/2021 | Park et al. |
| 11,129,491 | B2 | 9/2021 | Park et al. |
| D934,377 | S | 10/2021 | Schuler et al. |
| 11,147,413 | B2 | 10/2021 | Nabeiro et al. |
| 11,148,927 | B2 | 10/2021 | Wing et al. |
| 11,166,593 | B2 | 11/2021 | Trakselis |
| 11,167,231 | B2 | 11/2021 | Akdim et al. |
| 11,174,172 | B2 | 11/2021 | Dani et al. |
| 11,180,293 | B2 | 11/2021 | Sahara et al. |
| 11,191,286 | B2 | 12/2021 | Cross et al. |
| 11,194,443 | B2 | 12/2021 | Deo et al. |
| 11,198,623 | B2 | 12/2021 | Pretorius et al. |
| 11,203,515 | B2 | 12/2021 | Cook |
| 11,206,941 | B2 | 12/2021 | Abdo et al. |
| 11,208,313 | B2 | 12/2021 | Conover et al. |
| 11,208,314 | B2 | 12/2021 | Peirsman et al. |
| 11,225,423 | B1 | 1/2022 | Vizcaino et al. |
| 11,242,195 | B2 | 2/2022 | Nordqvist et al. |
| 11,246,326 | B2 | 2/2022 | Feola |
| 11,247,186 | B2 | 2/2022 | Topp-Manske |
| 11,247,892 | B2 | 2/2022 | Moore et al. |
| 11,250,659 | B2 | 2/2022 | Tansey et al. |
| 11,254,586 | B1 | 2/2022 | Santoiemmo |
| 11,267,724 | B2 | 3/2022 | Wiegele |
| 11,284,734 | B2 | 3/2022 | Hilckmann et al. |
| 11,284,736 | B2 | 3/2022 | Ochoa et al. |
| 11,284,738 | B2 | 3/2022 | Cahen et al. |
| 11,292,642 | B2 | 4/2022 | Hiltser et al. |
| 11,292,646 | B2 | 4/2022 | Bai et al. |
| 11,292,706 | B2 | 4/2022 | Showalter |
| 11,292,707 | B2 | 4/2022 | Lecomte et al. |
| 11,297,850 | B2 | 4/2022 | Popov et al. |
| 11,304,557 | B2 | 4/2022 | De Vreede et al. |
| 11,305,242 | B2 | 4/2022 | Wilder et al. |
| 11,317,755 | B2 | 5/2022 | Nabeiro et al. |
| 11,318,427 | B2 | 5/2022 | Fantappie et al. |
| 11,325,760 | B2 | 5/2022 | Alderson et al. |
| 11,325,818 | B2 | 5/2022 | Dahlberg et al. |
| 11,330,938 | B2 | 5/2022 | Deng et al. |
| 11,337,542 | B2 | 5/2022 | Kroos |
| 11,339,045 | B2 | 5/2022 | Conway et al. |
| 11,344,149 | B2 | 5/2022 | Byun et al. |
| 11,344,151 | B2 | 5/2022 | Rolla |
| 11,345,581 | B2 | 5/2022 | Cook |
| 11,345,583 | B2 | 5/2022 | Aslam et al. |
| 11,351,494 | B2 | 6/2022 | Nishijima et al. |
| 11,370,648 | B2 | 6/2022 | Melville, Jr. et al. |
| 11,406,205 | B2 | 8/2022 | Bissen et al. |
| 11,407,629 | B1 | 8/2022 | Siegel |
| 11,407,630 | B1 | 8/2022 | Shafir |
| 11,412,878 | B1 | 8/2022 | Wolf |
| 11,413,587 | B2 | 8/2022 | Van De Sluis et al. |
| 11,426,024 | B2 | 8/2022 | Tinkler et al. |
| 11,439,156 | B2 | 9/2022 | Voges et al. |
| 11,440,786 | B2 | 9/2022 | Springer et al. |
| 11,465,892 | B1 | 10/2022 | Dos Santos |
| 11,470,994 | B2 | 10/2022 | Hashimoto |
| 11,479,455 | B2 | 10/2022 | Fantappiéet al. |
| 11,479,457 | B2 | 10/2022 | Krüger et al. |
| 11,490,759 | B2 | 11/2022 | Accursi et al. |
| 11,518,606 | B2 | 12/2022 | Noth et al. |
| 11,518,607 | B2 | 12/2022 | Jarisch et al. |
| 11,534,730 | B1 | 12/2022 | Springer et al. |
| 11,554,910 | B2 | 1/2023 | Krüger |
| 11,589,703 | B1 | 2/2023 | Brogger et al. |
| 11,599,736 | B2 | 3/2023 | Yang |
| 11,634,271 | B2 | 4/2023 | Mchugh et al. |
| 11,745,996 | B1 | 9/2023 | Zbedlick |
| 11,751,585 | B1 | 9/2023 | Anthony et al. |
| 2009/0236007 | A1 | 9/2009 | Clusserath et al. |
| 2009/0294350 | A1 | 12/2009 | Moretto |
| 2012/0114814 | A1 | 5/2012 | Bippert |
| 2013/0020238 | A1 | 1/2013 | Moretto |
| 2013/0026665 | A1 | 1/2013 | Buosi et al. |
| 2014/0030383 | A1 | 1/2014 | Marchetti |
| 2014/0103549 | A1 | 4/2014 | Staneland |
| 2014/0154368 | A1 | 6/2014 | Kolls et al. |
| 2014/0175125 | A1 | 6/2014 | Breault |
| 2014/0216595 | A1 | 8/2014 | Raad |
| 2015/0008168 | A1 | 1/2015 | Moretto |
| 2015/0034674 | A1 | 2/2015 | Hertensen |
| 2015/0125586 | A1 | 5/2015 | Ergican |
| 2015/0151258 | A1 | 6/2015 | Cohen et al. |
| 2015/0225169 | A1 | 8/2015 | Jarisch |
| 2015/0353335 | A1 | 12/2015 | Breault |
| 2016/0009539 | A1 | 1/2016 | Jersey et al. |
| 2016/0130076 | A1 | 5/2016 | Jarisch |
| 2016/0192806 | A1 | 7/2016 | Pikkemaat et al. |
| 2016/0242456 | A1 | 8/2016 | Evans et al. |
| 2016/0255991 | A1 | 9/2016 | Givens et al. |
| 2016/0318689 | A1 | 11/2016 | Rudick et al. |
| 2016/0332124 | A1 | 11/2016 | Cohen |

(56) References Cited

U.S. PATENT DOCUMENTS

2017/0215645 A1 8/2017 Doglioni Majer et al.
2017/0246597 A1 8/2017 McClean et al.
2017/0334636 A1 11/2017 Park et al.
2017/0341856 A1 11/2017 Aschwanden
2018/0000280 A1 1/2018 Dubief
2018/0053443 A1 2/2018 David et al.
2018/0057337 A1 3/2018 Babucke et al.
2018/0086621 A1 3/2018 Dubief et al.
2018/0093820 A1 4/2018 Massey et al.
2018/0215603 A1 8/2018 Hecht
2018/0251361 A1 9/2018 Wing et al.
2018/0273398 A1 9/2018 Pehar et al.
2018/0354713 A1 12/2018 Ting et al.
2018/0356041 A1 12/2018 Despres et al.
2019/0039873 A1 2/2019 Aslam et al.
2019/0073928 A1 3/2019 Wei et al.
2019/0077586 A1 3/2019 Cafaro et al.
2019/0119137 A1 4/2019 Floren et al.
2019/0126174 A1 5/2019 Lombardo et al.
2019/0134583 A1 5/2019 Lautenschläger et al.
2019/0153368 A1 5/2019 Yoon et al.
2019/0169016 A1 6/2019 Vandekerckhove et al.
2019/0191916 A1 6/2019 Guyon et al.
2019/0241420 A1 8/2019 Peirsman et al.
2019/0262230 A1 8/2019 Bentkovski
2019/0269156 A1 9/2019 Van De Sluis et al.
2019/0270630 A1 9/2019 Dahan et al.
2019/0274469 A1 9/2019 Van De Sluis
2019/0274482 A1 9/2019 Abdo et al.
2019/0275478 A1 9/2019 Jersey et al.
2019/0290054 A1 9/2019 Weber et al.
2019/0291062 A1 9/2019 Wood et al.
2019/0291064 A1 9/2019 Conroy et al.
2019/0292034 A1 9/2019 Wood et al.
2019/0292036 A1 9/2019 Rice et al.
2019/0292069 A1 9/2019 Weston
2019/0298616 A1 10/2019 Quintero
2019/0328170 A1 10/2019 Cai
2019/0335952 A1 11/2019 Di Bari
2019/0337713 A1 11/2019 Ergican et al.
2019/0344233 A1 11/2019 Savino
2019/0367350 A1 12/2019 Bhutani et al.
2020/0000272 A1 1/2020 Nabeiro et al.
2020/0009482 A1 1/2020 Weitz
2020/0010311 A1 1/2020 Moore
2020/0017806 A1 1/2020 Peirsman et al.
2020/0031651 A1 1/2020 Schneidewend et al.
2020/0055741 A1 2/2020 Chernyi et al.
2020/0060465 A1 2/2020 Longman et al.
2020/0062476 A1 2/2020 Katayama et al.
2020/0077841 A1 3/2020 Dercar et al.
2020/0079637 A1 3/2020 Kaplita et al.
2020/0095029 A1 3/2020 Pehar et al.
2020/0100618 A1 4/2020 Guyon et al.
2020/0107669 A1 4/2020 Byun et al.
2020/0121115 A1 4/2020 Oh
2020/0122100 A1 4/2020 Tumey
2020/0122994 A1 4/2020 Cimatti et al.
2020/0146308 A1 5/2020 Roberts et al.
2020/0146500 A1 5/2020 Cafaro et al.
2020/0146501 A1 5/2020 Mchugh et al.
2020/0154937 A1 5/2020 Accursi et al.
2020/0156019 A1 5/2020 Sawyer et al.
2020/0170443 A1 6/2020 Chioda et al.
2020/0187718 A1 6/2020 Seidl
2020/0198956 A1 6/2020 Hartsfield et al.
2020/0207603 A1 7/2020 Sevcik
2020/0209071 A1 7/2020 Pariseau
2020/0216786 A1 7/2020 Pintz
2020/0229472 A1 7/2020 Manne
2020/0231372 A1 7/2020 Parise
2020/0253361 A1 8/2020 Davidson
2020/0276527 A1 9/2020 Macoretta et al.
2020/0281396 A1 9/2020 Accursi et al.
2020/0317537 A1 10/2020 Yamanoi et al.
2020/0326242 A1 10/2020 Capozzi
2020/0331739 A1 10/2020 Mehta et al.
2020/0339437 A1 10/2020 Huffmeyer
2020/0345170 A1 11/2020 Jarisch et al.
2020/0346138 A1 11/2020 Wong
2020/0359822 A1 11/2020 Dercar et al.
2020/0359841 A1 11/2020 Dercar et al.
2020/0369440 A1 11/2020 Croibier et al.
2020/0369446 A1 11/2020 Mélan-Moutet
2020/0369504 A1 11/2020 Balstad et al.
2020/0369505 A1 11/2020 Mckay
2020/0369537 A1 11/2020 Heitele
2020/0375221 A1 12/2020 Colvin et al.
2020/0376420 A1 12/2020 Mueller et al.
2020/0397184 A1 12/2020 Ruggiero et al.
2021/0000283 A1 1/2021 Burrows
2021/0000289 A1 1/2021 Krüger et al.
2021/0002044 A1 1/2021 Koenigseder
2021/0002046 A1 1/2021 Da Costa et al.
2021/0013785 A1 1/2021 Liang et al.
2021/0015303 A1 1/2021 Byun et al.
2021/0023486 A1 1/2021 Zöller
2021/0032087 A1 2/2021 Tessicini et al.
2021/0045572 A1 2/2021 Ninomiya et al.
2021/0052091 A1 2/2021 Lee et al.
2021/0052104 A1 2/2021 Perentes
2021/0078889 A1 3/2021 Welter et al.
2021/0100391 A1 4/2021 Moon et al.
2021/0100394 A1 4/2021 Affolter et al.
2021/0101722 A1 4/2021 Migas et al.
2021/0106163 A1 4/2021 Van De Sluis et al.
2021/0122540 A1 4/2021 Meager
2021/0122929 A1 4/2021 Hanes
2021/0137304 A1 5/2021 Krüger et al.
2021/0137315 A1 5/2021 Byun et al.
2021/0147138 A1 5/2021 Affolter et al.
2021/0171333 A1 6/2021 Amos
2021/0171360 A1 6/2021 Horn et al.
2021/0177189 A1 6/2021 Kordich et al.
2021/0177191 A1 6/2021 Noth
2021/0179411 A1 6/2021 Dahan et al.
2021/0196074 A1 7/2021 Guarin et al.
2021/0259472 A1 8/2021 Seidler et al.
2021/0261324 A1 8/2021 Arnold
2021/0276748 A1 9/2021 Deslandes et al.
2021/0276884 A1 9/2021 Horn et al.
2021/0292152 A1 9/2021 Fedorka et al.
2021/0307564 A1 10/2021 Gort-Barten
2021/0309422 A1 10/2021 Hiltser et al.
2021/0316913 A1 10/2021 Woody et al.
2021/0316979 A1 10/2021 Hayes-Pankhurst et al.
2021/0317393 A1 10/2021 Peirsman et al.
2021/0322903 A1 10/2021 Astle et al.
2021/0338004 A1 11/2021 Alsayar et al.
2021/0347623 A1 11/2021 Fantappie et al.
2021/0354883 A1 11/2021 Ferrari et al.
2021/0361112 A1 11/2021 Hobden et al.
2021/0362993 A1 11/2021 Shafir et al.
2021/0378267 A1 12/2021 Barak
2021/0380392 A1 12/2021 Glucksman et al.
2021/0387871 A1 12/2021 Emery et al.
2022/0002134 A1 1/2022 Pellaud
2022/0002135 A1 1/2022 Von Kraus et al.
2022/0022496 A1 1/2022 Monsanto et al.
2022/0024748 A1 1/2022 Fantappie et al.
2022/0031110 A1 2/2022 Sekulic et al.
2022/0031113 A1 2/2022 Smith et al.
2022/0033172 A1 2/2022 Favre
2022/0039587 A1 2/2022 De Freitas
2022/0039602 A1 2/2022 Xiong
2022/0040651 A1 2/2022 Böttcher et al.
2022/0042618 A1 2/2022 Kuzuya
2022/0053967 A1 2/2022 Guyon et al.
2022/0058984 A1 2/2022 Ambartsoumian
2022/0061581 A1 3/2022 Fernandes De Carvalho et al.
2022/0071435 A1 3/2022 Tseng
2022/0071437 A1 3/2022 Tseng
2022/0071440 A1 3/2022 Tseng et al.
2022/0071441 A1 3/2022 Patil et al.

(56) References Cited

U.S. PATENT DOCUMENTS

| | | | |
|---|---|---|---|
| 2022/0073238 | A1 | 3/2022 | Naumann et al. |
| 2022/0073336 | A1 | 3/2022 | Savioz |
| 2022/0081322 | A1 | 3/2022 | Yoshinobu et al. |
| 2022/0081338 | A1 | 3/2022 | Petner |
| 2022/0082542 | A1 | 3/2022 | Lachwani et al. |
| 2022/0088937 | A1 | 3/2022 | Oya |
| 2022/0098020 | A1 | 3/2022 | Garcia Tebar |
| 2022/0106177 | A1 | 4/2022 | Tansey et al. |
| 2022/0106180 | A1 | 4/2022 | Rue et al. |
| 2022/0128197 | A1 | 4/2022 | Danieli et al. |
| 2022/0135294 | A1 | 5/2022 | Peng et al. |
| 2022/0151439 | A1 | 5/2022 | Fantappie et al. |
| 2022/0167765 | A1 | 6/2022 | Ruddy et al. |
| 2022/0169424 | A1 | 6/2022 | Yang |
| 2022/0178766 | A1 | 6/2022 | Baston |
| 2022/0192422 | A1 | 6/2022 | Choi |
| 2022/0218137 | A1 | 7/2022 | Iverson et al. |
| 2022/0221212 | A1 | 7/2022 | Carr et al. |
| 2022/0268617 | A1 | 8/2022 | Zheng |
| 2022/0280392 | A1 | 9/2022 | Baxter |
| 2022/0287333 | A1 | 9/2022 | Aldred et al. |
| 2022/0289548 | A1 | 9/2022 | Augsburger |
| 2022/0330742 | A1 | 10/2022 | Toannidis et al. |
| 2022/0338669 | A1 | 10/2022 | Hadden et al. |
| 2022/0369851 | A1 | 11/2022 | Tonelli et al. |
| 2023/0038172 | A1 | 2/2023 | Guyon et al. |
| 2023/0047623 | A1 | 2/2023 | Krüger et al. |
| 2023/0050173 | A1 | 2/2023 | Farahat et al. |
| 2023/0065625 | A1 | 3/2023 | Mills et al. |
| 2023/0066001 | A1 | 3/2023 | Guyon |
| 2023/0083151 | A1 | 3/2023 | Cheng |

FOREIGN PATENT DOCUMENTS

| | | | |
|---|---|---|---|
| CA | 2510816 | C | 3/2013 |
| CA | 146294 | S | 5/2013 |
| CA | 148591 | S | 11/2013 |
| CA | 2920909 | A1 | 2/2015 |
| CA | 2968899 | A1 | 6/2016 |
| CA | 168640 | S | 12/2016 |
| CA | 3000309 | A1 | 4/2017 |
| CA | 2961679 | C | 7/2018 |
| CA | 2802688 | C | 4/2020 |
| CA | 3129124 | A1 | 2/2022 |
| CN | 1016312 | B | 4/1992 |
| CN | 201200323 | Y | 3/2009 |
| CN | 201451258 | U | 5/2010 |
| CN | 101432221 | B | 8/2012 |
| CN | 203314745 | U | 12/2013 |
| CN | 203576299 | U | 5/2014 |
| CN | 203749208 | U | 8/2014 |
| CN | 103720363 | B | 11/2015 |
| CN | 102794043 | B | 3/2016 |
| CN | 103213928 | B | 5/2016 |
| CN | 105595868 | A | 5/2016 |
| CN | 103582613 | B | 8/2016 |
| CN | 105997523 | A | 10/2016 |
| CN | 105997524 | A | 10/2016 |
| CN | 106115997 | A | 11/2016 |
| CN | 106175434 | A | 12/2016 |
| CN | 104828373 | B | 1/2017 |
| CN | 103379843 | B | 3/2017 |
| CN | 106667266 | A | 5/2017 |
| CN | 106746020 | A | 5/2017 |
| CN | 105559484 | B | 6/2017 |
| CN | 106859329 | A | 6/2017 |
| CN | 104602782 | B | 7/2017 |
| CN | 107007167 | A | 8/2017 |
| CN | 206424631 | U | 8/2017 |
| CN | 105000258 | B | 10/2017 |
| CN | 105078252 | B | 10/2017 |
| CN | 106144192 | B | 10/2017 |
| CN | 106510363 | B | 12/2017 |
| CN | 107692737 | A | 2/2018 |
| CN | 107802500 | A | 3/2018 |
| CN | 108056923 | A | 5/2018 |
| CN | 106388503 | B | 6/2018 |
| CN | 106419392 | B | 6/2018 |
| CN | 106667194 | B | 6/2018 |
| CN | 108261829 | A | 7/2018 |
| CN | 108264101 | A | 7/2018 |
| CN | 108324054 | A | 7/2018 |
| CN | 108338621 | A | 7/2018 |
| CN | 105816042 | B | 8/2018 |
| CN | 108358354 | A | 8/2018 |
| CN | 108567334 | A | 9/2018 |
| CN | 108814292 | A | 11/2018 |
| CN | 109044107 | A | 12/2018 |
| CN | 208291834 | U | 12/2018 |
| CN | 109171502 | A | 1/2019 |
| CN | 109222555 | A | 1/2019 |
| CN | 109380973 | A | 2/2019 |
| CN | 208460100 | U | 2/2019 |
| CN | 106955024 | B | 4/2019 |
| CN | 109549477 | A | 4/2019 |
| CN | 109662579 | A | 4/2019 |
| CN | 106163972 | B | 6/2019 |
| CN | 109966941 | A | 7/2019 |
| CN | 109984598 | A | 7/2019 |
| CN | 106923679 | B | 9/2019 |
| CN | 110247484 | A | 9/2019 |
| CN | 110279302 | A | 9/2019 |
| CN | 110279304 | A | 9/2019 |
| CN | 109584027 | B | 11/2019 |
| CN | 110526345 | A | 12/2019 |
| CN | 110664248 | A | 1/2020 |
| CN | 209988362 | U | 1/2020 |
| CN | 110835127 | A | 2/2020 |
| CN | 110890016 | A | 3/2020 |
| CN | 107709675 | B | 4/2020 |
| CN | 105011305 | B | 5/2020 |
| CN | 111141408 | A | 5/2020 |
| CN | 103946870 | B | 6/2020 |
| CN | 106334342 | B | 6/2020 |
| CN | 111276036 | A | 6/2020 |
| CN | 106334341 | B | 7/2020 |
| CN | 109596190 | B | 7/2020 |
| CN | 111449472 | A | 7/2020 |
| CN | 111466793 | A | 7/2020 |
| CN | 111528668 | A | 8/2020 |
| CN | 111589315 | A | 8/2020 |
| CN | 111661902 | A | 9/2020 |
| CN | 111744378 | A | 10/2020 |
| CN | 211794140 | U | 10/2020 |
| CN | 111954643 | A | 11/2020 |
| CN | 109846366 | B | 12/2020 |
| CN | 110272011 | B | 12/2020 |
| CN | 110529604 | B | 12/2020 |
| CN | 112089338 | A | 12/2020 |
| CN | 112205874 | A | 1/2021 |
| CN | 112358068 | A | 2/2021 |
| CN | 112421819 | A | 2/2021 |
| CN | 112426036 | A | 3/2021 |
| CN | 112473431 | A | 3/2021 |
| CN | 112971528 | A | 6/2021 |
| CN | 112998522 | A | 6/2021 |
| CN | 213535824 | U | 6/2021 |
| CN | 113142938 | A | 7/2021 |
| CN | 113143007 | A | 7/2021 |
| CN | 113171010 | A | 7/2021 |
| CN | 111513564 | B | 8/2021 |
| CN | 213885723 | U | 8/2021 |
| CN | 108768070 | B | 9/2021 |
| CN | 113498973 | A | 10/2021 |
| CN | 113558447 | A | 10/2021 |
| CN | 109640754 | B | 11/2021 |
| CN | 113598610 | A | 11/2021 |
| CN | 214731066 | U | 11/2021 |
| CN | 113885601 | A | 1/2022 |
| CN | 113907584 | A | 1/2022 |
| CN | 113907585 | A | 1/2022 |
| CN | 109863112 | B | 2/2022 |
| CN | 114084972 | A | 2/2022 |
| CN | 111839219 | B | 3/2022 |

(56) References Cited

FOREIGN PATENT DOCUMENTS

| | | | |
|---|---|---|---|
| CN | 114158942 | A | 3/2022 |
| CN | 114246473 | A | 3/2022 |
| CN | 111839218 | B | 4/2022 |
| CN | 114341051 | A | 4/2022 |
| CN | 106235882 | B | 5/2022 |
| CN | 110719894 | B | 5/2022 |
| CN | 114424888 | A | 5/2022 |
| CN | 114424889 | A | 5/2022 |
| CN | 110461197 | B | 7/2022 |
| DE | 102010042541 | A1 | 4/2012 |
| DE | 202012103731 | U1 | 11/2012 |
| DE | 102007034158 | B9 | 1/2013 |
| DE | 102009046888 | B4 | 7/2013 |
| DE | 102012100844 | A1 | 8/2013 |
| DE | 202014105236 | U1 | 1/2015 |
| DE | 202016103902 | U1 | 9/2016 |
| DE | 102010012175 | B4 | 3/2017 |
| DE | 102008012486 | B4 | 11/2017 |
| DE | 102019125181 | A1 | 3/2021 |
| DE | 202021100801 | U1 | 3/2021 |
| DE | 102008064945 | B3 | 5/2021 |
| DE | 102011123025 | B3 | 8/2021 |
| DE | 202021104150 | U1 | 8/2021 |
| DE | 202021104644 | U1 | 9/2021 |
| DE | 102020004146 | A1 | 1/2022 |
| EP | 1005897 | A3 | 7/2002 |
| EP | 1351758 | B1 | 7/2005 |
| EP | 1644281 | A2 | 4/2006 |
| EP | 1484097 | B1 | 10/2006 |
| EP | 1579906 | B1 | 5/2007 |
| EP | 1727449 | B1 | 9/2007 |
| EP | 1607664 | B1 | 1/2008 |
| EP | 1751011 | B1 | 1/2008 |
| EP | 1767262 | B1 | 8/2008 |
| EP | 1832326 | B1 | 12/2008 |
| EP | 1718403 | B1 | 5/2011 |
| EP | 2387547 | B1 | 7/2012 |
| EP | 2340754 | B1 | 10/2012 |
| EP | 1966065 | B2 | 11/2012 |
| EP | 2070586 | B1 | 5/2013 |
| EP | 2737834 | A1 | 6/2014 |
| EP | 2802245 | A1 | 11/2014 |
| EP | 2604573 | B1 | 1/2015 |
| EP | 2651829 | B1 | 6/2015 |
| EP | 2969899 | A2 | 1/2016 |
| EP | 2539849 | B1 | 2/2016 |
| EP | 2992945 | A1 | 3/2016 |
| EP | 2992946 | A1 | 3/2016 |
| EP | 3034474 | A1 | 6/2016 |
| EP | 2870473 | B1 | 2/2017 |
| EP | 3141896 | A1 | 3/2017 |
| EP | 2359260 | B1 | 6/2017 |
| EP | 2799205 | B1 | 7/2017 |
| EP | 3066033 | A4 | 8/2017 |
| EP | 2890978 | B1 | 9/2017 |
| EP | 3250512 | A2 | 12/2017 |
| EP | 2976975 | B1 | 1/2018 |
| EP | 3261981 | A1 | 1/2018 |
| EP | 2870472 | B1 | 9/2018 |
| EP | 2977658 | B1 | 10/2018 |
| EP | 3017734 | B1 | 12/2018 |
| EP | 3478137 | A1 | 5/2019 |
| EP | 2767194 | B1 | 8/2019 |
| EP | 2952859 | B1 | 8/2019 |
| EP | 3118165 | B1 | 8/2019 |
| EP | 3538493 | A1 | 9/2019 |
| EP | 2900603 | B1 | 10/2019 |
| EP | 2504271 | B1 | 4/2020 |
| EP | 3632853 | A1 | 4/2020 |
| EP | 3524223 | A4 | 5/2020 |
| EP | 2702010 | B1 | 6/2020 |
| EP | 3507247 | B1 | 6/2020 |
| EP | 2866593 | B1 | 8/2020 |
| EP | 2890643 | B1 | 11/2020 |
| EP | 3734579 | A1 | 11/2020 |
| EP | 3753458 | A1 | 12/2020 |
| EP | 3656742 | B1 | 5/2021 |
| EP | 3838374 | A1 | 6/2021 |
| EP | 3434351 | B1 | 7/2021 |
| EP | 3870962 | A1 | 9/2021 |
| EP | 3871994 | A1 | 9/2021 |
| EP | 3898527 | A1 | 10/2021 |
| EP | 3835266 | A3 | 11/2021 |
| EP | 3907188 | A1 | 11/2021 |
| EP | 3967662 | A1 | 3/2022 |
| EP | 3808230 | B1 | 6/2022 |
| EP | 4008688 | A1 | 6/2022 |
| EP | 4047360 | A1 | 8/2022 |
| EP | 3810543 | A4 | 9/2022 |
| EP | 4069626 | A1 | 10/2022 |
| EP | 3275345 | B2 | 2/2023 |
| EP | 4129126 | A1 | 2/2023 |
| EP | 4129127 | A1 | 2/2023 |
| FR | 2981245 | B1 | 11/2013 |
| GB | 2486872 | B | 3/2016 |
| WO | 9725130 | A1 | 7/1997 |
| WO | 9807122 | A1 | 2/1998 |
| WO | 0103817 | A1 | 1/2001 |
| WO | 03098776 | A1 | 11/2003 |
| WO | 2006101394 | A2 | 9/2006 |
| WO | 2009135758 | A1 | 11/2009 |
| WO | 2011134793 | A1 | 11/2011 |
| WO | 2012168880 | A1 | 12/2012 |
| WO | 2013019963 | A3 | 5/2013 |
| WO | 2014037456 | A1 | 3/2014 |
| WO | 2014131101 | A1 | 9/2014 |
| WO | 2014200481 | A1 | 12/2014 |
| WO | 2014201753 | A1 | 12/2014 |
| WO | 2015109639 | A1 | 7/2015 |
| WO | 2016073069 | A1 | 5/2016 |
| WO | 2016087474 | A1 | 6/2016 |
| WO | 2016202815 | A1 | 12/2016 |
| WO | 2017056048 | A1 | 4/2017 |
| WO | 2017096505 | A1 | 6/2017 |
| WO | 2017097494 | A1 | 6/2017 |
| WO | 2017109718 | A1 | 6/2017 |
| WO | 2019175603 | A1 | 9/2019 |
| WO | 2019234202 | A1 | 12/2019 |
| WO | 2020092859 | A8 | 6/2020 |
| WO | 2020136290 | A1 | 7/2020 |
| WO | 2020148294 | A1 | 7/2020 |
| WO | 2020152050 | A1 | 7/2020 |
| WO | 2020148293 | A3 | 9/2020 |
| WO | 2020174336 | A1 | 9/2020 |
| WO | 2020193376 | A1 | 10/2020 |
| WO | 2020198811 | A1 | 10/2020 |
| WO | 2020201487 | A1 | 10/2020 |
| WO | 2020219385 | A1 | 10/2020 |
| WO | 2020234009 | A1 | 11/2020 |
| WO | 2020234010 | A1 | 11/2020 |
| WO | 2020234060 | A1 | 11/2020 |
| WO | 2020239836 | A1 | 12/2020 |
| WO | 2021013581 | A1 | 1/2021 |
| WO | 2021014259 | A1 | 1/2021 |
| WO | 2021014261 | A1 | 1/2021 |
| WO | 2021016331 | A1 | 1/2021 |
| WO | 2021016343 | A1 | 1/2021 |
| WO | 2021018760 | A1 | 2/2021 |
| WO | 2021019161 | A1 | 2/2021 |
| WO | 2021019541 | A1 | 2/2021 |
| WO | 2021032892 | A1 | 2/2021 |
| WO | 2020182862 | A3 | 3/2021 |
| WO | 2021052715 | A1 | 3/2021 |
| WO | 2021055937 | A1 | 3/2021 |
| WO | 2021074639 | A1 | 4/2021 |
| WO | 2021079284 | A1 | 4/2021 |
| WO | 2021089222 | A1 | 5/2021 |
| WO | 2021093936 | A1 | 5/2021 |
| WO | 2021094014 | A1 | 5/2021 |
| WO | 2021101990 | A1 | 5/2021 |
| WO | 2021104708 | A1 | 6/2021 |
| WO | 2021105177 | A1 | 6/2021 |
| WO | 2021105491 | A1 | 6/2021 |
| WO | 2021115135 | A1 | 6/2021 |

(56) References Cited

FOREIGN PATENT DOCUMENTS

| | | | |
|---|---|---|---|
| WO | 2021119848 | A1 | 6/2021 |
| WO | 2021121758 | A1 | 6/2021 |
| WO | 2021121760 | A1 | 6/2021 |
| WO | 2021122575 | A1 | 6/2021 |
| WO | 2021138385 | A1 | 7/2021 |
| WO | 2021140254 | A1 | 7/2021 |
| WO | 2021145540 | A1 | 7/2021 |
| WO | 2021168069 | A1 | 8/2021 |
| WO | 2021174309 | A1 | 9/2021 |
| WO | 2021179024 | A1 | 9/2021 |
| WO | 2021191774 | A1 | 9/2021 |
| WO | 2021198162 | A1 | 10/2021 |
| WO | 2021201021 | A1 | 10/2021 |
| WO | 2021209507 | A1 | 10/2021 |
| WO | 2021223904 | A1 | 11/2021 |
| WO | 2021223942 | A1 | 11/2021 |
| WO | 2021228877 | A1 | 11/2021 |
| WO | 2021233931 | A1 | 11/2021 |
| WO | 2021240307 | A1 | 12/2021 |
| WO | 2021240308 | A1 | 12/2021 |
| WO | 2021240311 | A1 | 12/2021 |
| WO | 2021259617 | A1 | 12/2021 |
| WO | 2022013549 | A1 | 1/2022 |
| WO | 2022022902 | A1 | 2/2022 |
| WO | 2022038408 | A1 | 2/2022 |
| WO | 2022043011 | A1 | 3/2022 |
| WO | 2022051389 | A1 | 3/2022 |
| WO | 2022051839 | A1 | 3/2022 |
| WO | 2022058241 | A1 | 3/2022 |
| WO | 2022069098 | A1 | 4/2022 |
| WO | 2022093795 | A1 | 5/2022 |
| WO | 2022101253 | A1 | 5/2022 |
| WO | 2022106683 | A1 | 5/2022 |
| WO | 2022126811 | A1 | 6/2022 |
| WO | 2022152497 | A1 | 7/2022 |
| WO | 2022167560 | A3 | 9/2022 |
| WO | 2022189622 | A1 | 9/2022 |
| WO | 2022189623 | A1 | 9/2022 |
| WO | 2022194644 | A1 | 9/2022 |
| WO | 2022195435 | A1 | 9/2022 |
| WO | 2022195450 | A1 | 9/2022 |
| WO | 2022234356 | A1 | 11/2022 |
| WO | 2022246480 | A1 | 11/2022 |
| WO | 2022249079 | A1 | 12/2022 |
| WO | 2022253617 | A1 | 12/2022 |
| WO | 2023001918 | A1 | 1/2023 |
| WO | 2023274904 | A1 | 1/2023 |
| WO | 2023285370 | A1 | 1/2023 |
| WO | 2023285374 | A1 | 1/2023 |
| WO | 2023285378 | A1 | 1/2023 |
| WO | 2023285548 | A1 | 1/2023 |
| WO | 2023006991 | A1 | 2/2023 |
| WO | 2023021475 | A2 | 2/2023 |
| WO | 2023046577 | A1 | 3/2023 |

* cited by examiner

MIXING FUNNEL

CROSS-REFERENCE TO RELATED APPLICATIONS

This application is a divisional of U.S. patent application Ser. No. 18/300,860, filed Apr. 14, 2023, and titled "MIXING FUNNEL," which is hereby incorporated by reference herein its entirety.

FIELD

The subject matter described herein relates to a mixing funnel to encourage thorough mixing of carbonated water and an additive.

BACKGROUND

Conventional beverage dispensing devices operate to carbonate and/or augment water. Some devices may mix carbonated water and an additive, such as flavoring or vitamins, together in a machine and then dispense the resulting mixture into a receptacle. Unless the devices are thoroughly cleaned, this method can result in contamination occurring over time. Other devices rely on crushing, puncturing, and/or generally compromising additive containers in order to access the additives retained within the containers. These methods of breaching flavoring containers can result in splatter and mess, which, if not thoroughly cleaned, can result in similar contamination.

Still other devices rely on carbonating water within a specialized container to be attached to the device, and from which the resulting beverage is served. The container can be pre-filled with water and/or an additive, and then it can be secured to the devices and pressurized within the container and used to serve the resulting beverage. These devices, however, can create excess plastic waste, as specially adapted bottles must be produced to interface with the device. In addition, these devices can only produce a single beverage within the pressurized container.

Accordingly, there remains a need for improved methods and devices for carbonating and dispensing mixed beverages.

SUMMARY

This disclosure relates to mixing additives for a carbonated beverage.

An example embodiment of the subject matter described herein is a beverage device with the following features. A housing can have a first outlet configured to emit a primary fluid and at least one secondary outlet configured to emit an additive to be mixed with the primary fluid. A funnel can be arranged on the housing to receive the primary fluid through a funnel inlet.

In some embodiments, at least one secondary outlet and a second secondary outlet can be configured to emit a first additive and a second additive respectively. The funnel can be arranged to receive the first additive in a first fluid passage and the second additive in a second fluid passage respectively. Each passage can be defined by the funnel.

In some embodiments, the funnel can include a partition configured to direct the primary fluid along first and second flow passages. The partition can include a fluid outlet path configured to direct the primary fluid from the first and second flow passages to a funnel outlet. The funnel itself can be arranged on the housing to receive the additive at a location adjacent to the funnel inlet such that the additive flows with the primary fluid along at least one of the first and second flow passages and through the fluid outlet passage to the funnel outlet.

In some embodiments, the mixing funnel for mixing fluids includes a tray. The tray can have a back wall with a fluid inlet arranged to receive a primary fluid flow. A bottom surface of the tray can extend from the back wall towards the front wall and can have first and second fluid passages formed such that primary fluid flow from the fluid inlet is divided to flow along the first and second fluid passages. The first and second fluid passages can be sloped downward from the funnel inlet to a mixing area and can direct the primary fluid flow to a mixing area adjacent the front wall of the tray. A fluid outlet passage can extend from the mixing area to the funnel outlet. For example, fluid outlet passage can be sloped downward from the mixing area to the funnel outlet. Such an outlet for fluid can be arranged to receive the primary fluid flow from the mixing area.

In some embodiments, the fluid inlet and the outlet are positioned adjacent the back wall. In addition, at least one wicking rib can extend between the inlet and the outlet along an outside of the tray. In some embodiments, a handle can be formed on the front wall of the tray.

A partition can be located between the first and second fluid passages and configured to direct the primary fluid flow from fluid inlet into the first and second fluid passages. In some embodiments, the partition can define an exit flow path extending to the fluid outlet. The partition can project upward from the bottom surface and is substantially U-shaped. The bottom surface can be sloped downward from the back wall towards a front wall of the tray.

A variety of features can be included to mitigate any splashing that may occur during operation. For example, ribs can extend from an upper edge of the tray towards an interior of the mixing funnel. Alternatively or in addition, a removable cover can be disposed over the tray. In such embodiments, the cover can include ports to allow for fluid ingress. In some embodiments, an interior surface of the tray can be hydrophilic.

BRIEF DESCRIPTION OF THE FIGURES

These and other features will be more readily understood from the following detailed description taken in conjunction with the accompanying drawings.

Figure 1:
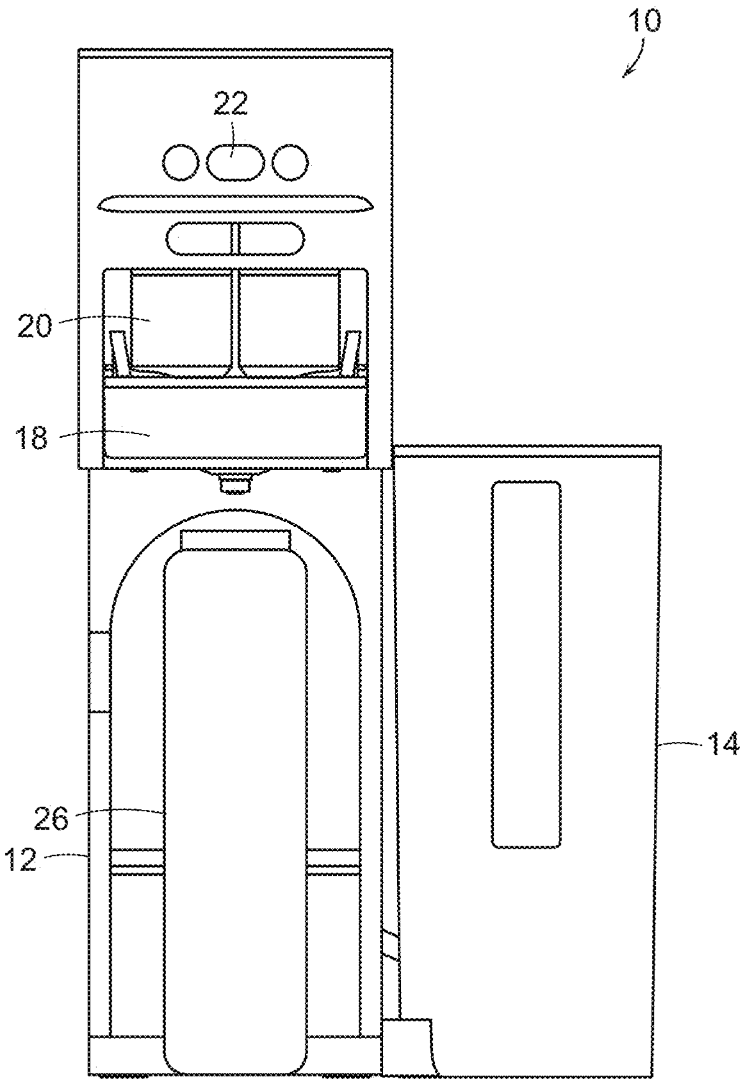
FIG. 1 is a front view of one embodiment of a beverage dispensing system.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting embodiments and that the scope of the present invention is defined solely by the claims. The features illustrated or described in connection with one embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

In general, a mixing funnel for mixing a carbonated fluid with an additive is described herein. The mixing funnel can be configured for use in a carbonated beverage system and it can be arranged to receive a primary fluid and at least one additive. The primary fluid can be any fluid, such as water, and it may or may not be a carbonated fluid. In the context of this disclosure, "carbonated fluid" encompasses fluids with any gas, such as nitrogen and/or carbon dioxide, entrained in the fluid such that the fluid has an effervescent quality. While primarily described as using carbonated fluid, non-carbonated fluids can be used as well, for example, water or alcohol can be used without departing from this disclosure. In some embodiments, the mixing funnel for mixing fluids can be in the form of a tray. The tray can have a fluid inlet arranged to receive the primary fluid flow, and it can include first and second fluid passages such that primary fluid flow from the fluid inlet is divided to flow along the first and second fluid passages. The tray can also be positioned to receive one or more additives in the first and second fluid passages, such that the additive(s) flow into the primary fluid flow. The first and second fluid passages can be sloped downward from the fluid inlet to a mixing area, which can be configured to aid in mixing the additive(s) with the primary fluid. A fluid outlet passage can extend from the mixing area to a funnel outlet, whereby the combined primary fluid and an additive is emitted. The use of a single outlet nozzle can allow for drinking vessels with narrow openings to receive the resulting beverage.

Figure 2:
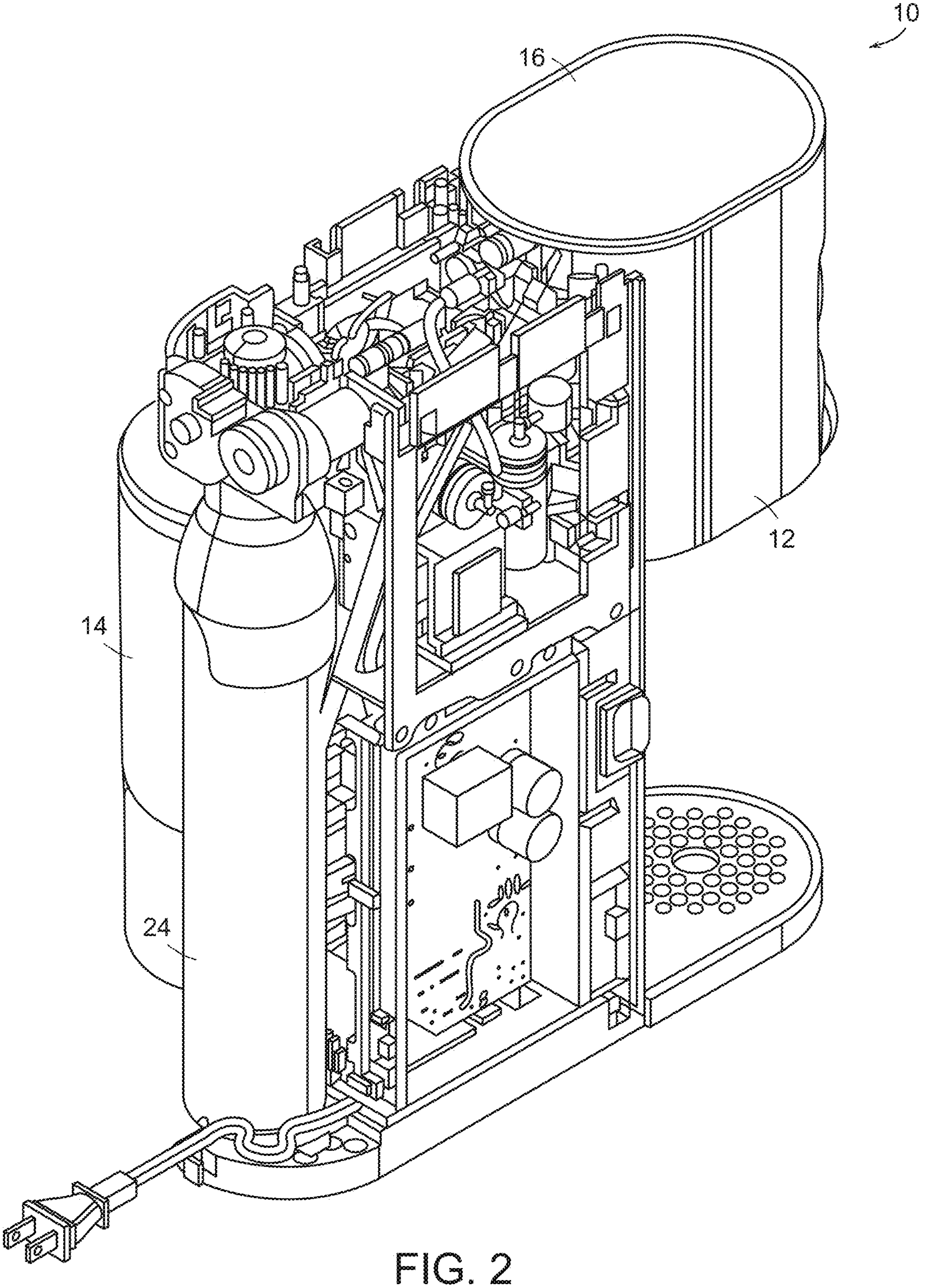
FIG. 2 is a rear perspective view of the beverage dispensing system of FIG. 1 with various housing components removed.

FIGS. 1-2 illustrate a beverage dispensing system 10 according to one embodiment. A person skilled in the art will appreciate that the mixing funnel can be used with any beverage dispensing system, and the illustrated system is merely one example of such a system. The beverage dispensing system 10 can be used to create and dispense customized beverages for a user, based on desired characteristics of the beverage. The illustrated beverage dispensing system 10 generally includes a housing 12 having a fluid reservoir 14 and a carbonation assembly 16. In the illustrated system 10, a mixing funnel 18 is included for receiving one or more additives from containers 20, as well as the primary fluid to be used in the creation of beverages. The additive containers 20 can include one or more additives (e.g., a flavorant, a vitamin, a food dye, etc.) to be included in a created beverage as desired. In some embodiments, two additive containers 20 can be used. Each additive container can include its own outlet arranged to emit additives into the mixing funnel 18. A person skilled in the art will appreciate that the mixing funnel disclosed herein can be used in any beverage dispensing system, including those that lack an additive container. Other beverage dispensing systems include, by way of non-limiting example, coffee, tea, beer, juice, and similar beverage-making apparatus.

During a beverage dispensing process, a user can actuate inputs located at a user interface 22 in order to select specific characteristics of the desired beverage, such as fluid volume and carbonation level. If the user selects inputs to indicate that the beverage is carbonated, water can be fed from the fluid reservoir 14 and into the carbonation assembly 16, and carbon-dioxide can be fed from a canister 24 and into the carbonation assembly 16 to produce carbonated water. The beverage can be dispensed into a container, such as a flask 26, from an outlet of the funnel 18.

Examples of beverage dispensing systems compatible with the carbonation mixing chamber provided herein may be found in U.S. patent application Ser. No. 17/989,640, entitled "ADDITIVE CONTAINERS FOR USE WITH BEVERAGE DISPENSERS" filed on Nov. 17, 2022, and U.S. patent application Ser. No. 17/744,459, entitled "FLAVORED BEVERAGE CARBONATION SYSTEM" filed on May 13, 2022, the contents of both of which are hereby incorporated by reference in their entirety.

Figure 3A:
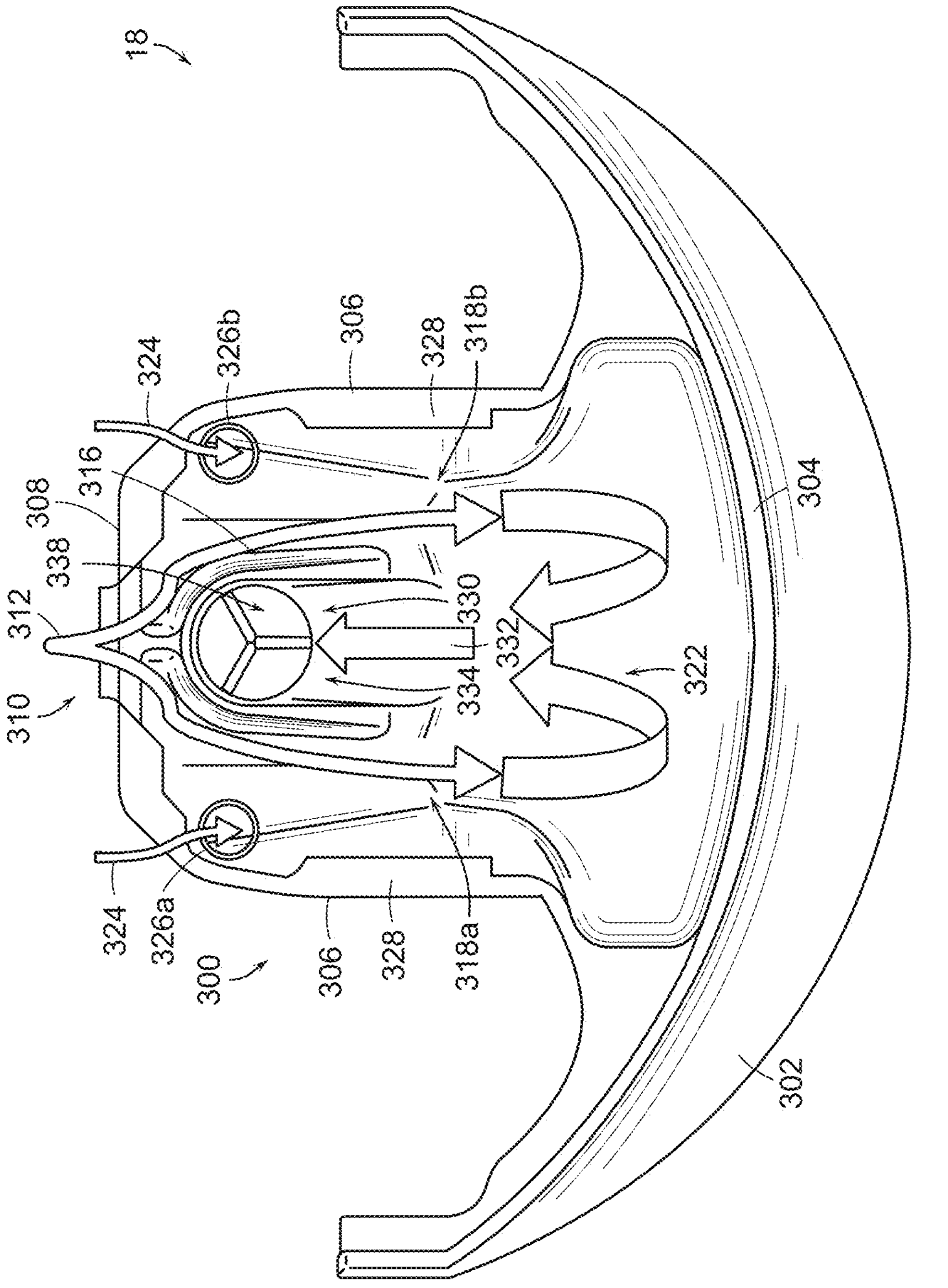
FIG. 3A is a top-down view of one embodiment of a mixing funnel with fluid paths annotated.
Figure 3B:
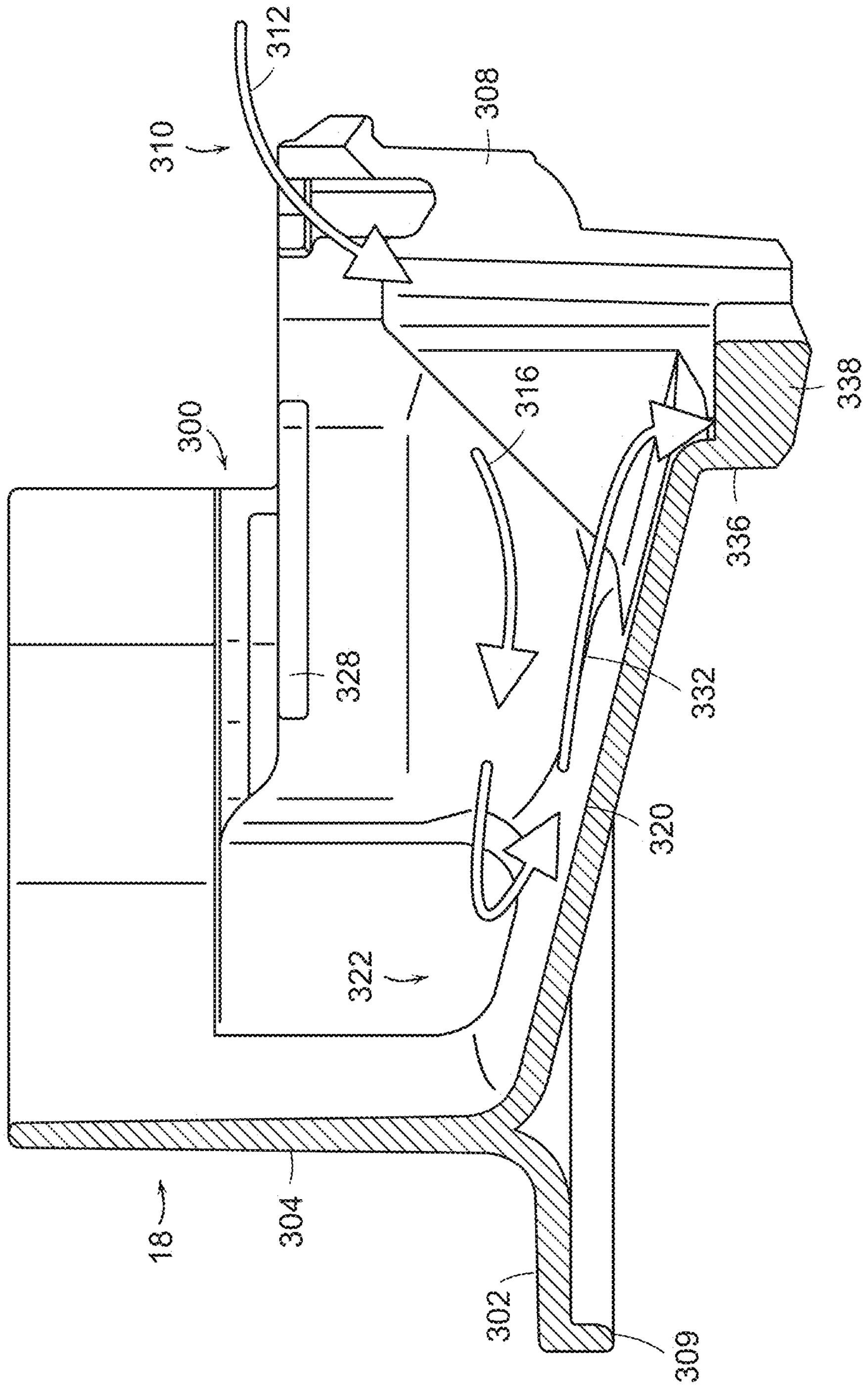
FIG. 3B is a side cross-sectional view of the mixing funnel of FIG. 3A with fluid paths annotated.

The mixing funnel 18 is shown in more detail in FIG. 3A and FIG. 3B. The illustrated funnel 18 includes a tray 300 and a handle 302 extending along a front outer portion of the tray 300. The tray 300 can have a variety of configurations, but generally includes a front wall 304, a back wall 308, and opposed side walls 306. Extending between the walls is a tray bottom 320. The tray bottom can define features to aid in fluid flow and mixing as will be discussed below. The handle 302 can define all or a portion of the front wall 304 of a tray 300. In some embodiments, the handle 302 can project radially outward from the front wall 304, for example, along an entirety of the front wall 304. In some embodiments, the handle 304 can extend laterally past side walls 306 of the tray 300. In some embodiments, the front of the tray 300 and/or the handle 302 can have a profile matching an outer surface of the beverage dispensing system 10. In some embodiments, the handle 302 can define a shoulder 309 (FIG. 3B) along its forward-most edge to provide an improved grip for the user.

As indicated above, the tray 300 can define several areas to direct fluid flow. In the illustrated embodiment, a fluid inlet 310 can be arranged in the back wall 308 of the tray 300 to receive a primary fluid flow 312, for example, water or carbonated water. While the fluid inlet 310 is shown formed in the back wall 308, in other embodiments the fluid inlet 310 can be adjacent the back wall or formed at other locations in the tray, including simply positioned above the tray. Regardless of location, the inlet 310 can be shaped to receive, retain, or otherwise engage with an outlet of the beverage dispensing system 10. For example, in embodiments where the beverage dispensing system 10 emits the primary fluid from a tubular conduit, the tray inlet 310 can define a partially circular or hemi-cylindrical profile to engage with the tubular conduit. As further shown in FIG. 3A, in order to aid in fluid flow through the inlet 310, the inlet 310 can taper radially outward from the inlet toward the tray center.

Following the primary fluid flow 312, after the primary fluid enters the inlet 310, the primary fluid flow 312 can impact a partition 316 dividing and directing the primary fluid flow 312 into a first flow passage 318*a* and a second flow passage 318*b* with the partition 316 positioned between them. In some embodiments, the partition 316 projects upward from a bottom surface 320 of the tray 300 and can be U-shaped. However, other partition shapes and arrangements, such as a V-shape, can be used without departing from this disclosure. Further, while a single partition is shown to divide the tray into two flow passages 318*a*, 318*b*, the use of a partition and/or the number of partitions can vary depending on the number of additive containers to be used in the beverage dispensing system. For example, a system that receives only a single additive container may have a tray that lacks a partition altogether, whereas a system that receives three additive containers may have two partitions for form three flow passages.

In the illustrated embodiment, each of the flow passages is defined by the partition 316, a bottom surface 320 of the tray 300, and side walls 306 of the tray 300. The portion of bottom surface 320 defining the flow passages 318*a*, 318*b* can be slanted or sloped downward from the inlet 310 at the back to the front of the tray to direct the primary fluid flow 312 towards a mixing area 322 located near a front wall 304 of the tray (e.g., adjacent or nearer the front wall 304 than the back wall 308). Further, the flow passages 318*a*, 318*b* can be tapered inward from the back to the front to direct fluid into the mixing area, discussed below. Each of the fluid passages 318*a*, 318*b* can be positioned below outlets of the additive containers 20. That is, the additives 324 can be received by the tray 300 at a first receiving area 326*a* and/or a second receiving area 326*b*. In operation, the additives can be delivered into either flow passage 318*a*, 318*b* for a duration of time, and the primary fluid flow 312 can flow through the passages 318*a*, 318*b* during or after the duration of time. That is, the primary fluid is used to carry away an entirety (e.g., most of) the additive 324 to help keep the tray 300 clean.

Several features can be used to reduce the risk of fluids splashing out or the tray 300. In some embodiments, the primary fluid flow 312 is feed into the funnel 18 at a low pressure or gravity only, and the additives 324 are fed into the funnel 18 with low pressure or gravity only. However, in some instances, a hard dispense can occur. Such an event can occur when pressure upstream of the inlet 310 is not vented down to atmospheric pressure prior to dispensing the primary fluid flow 312. This can result in the high pressure primary fluid flow 312 potentially causing splashing. Thus, retaining ribs 328 can extend from the side walls 306 and/or back wall 308 towards an interior of the tray 300 to overhang the fluid passages 318*a*, 318*b* thereby preventing (or reducing the likelihood of) fluid from flowing above the upper boundary of the tray 300. Alternatively or in addition, the ribs 328 can perform a similar function regarding the additives 324, for example, with embodiments that emit additives 324 at high enough pressure to result in splashing. In such embodiments, gaps in the retaining ribs 328 can be included as to allow for fluid ingress into the tray, such as around the inlet 310 or around the target areas 326*a*, 326*b* that receive the additives 324 from the additive containers 20 (FIG. 1) located above the funnel 18.

The fluid passages 318*a*, 318*b* can combine once again at the mixing area 322. The mixing area 322 can be defined, at least in part, by the bottom surface 320 of the tray 300 sloping downward towards an outlet nozzle 330. The outlets of the fluid passages 318*a*, 318*b* and the mixing area 322 are arranged to swirl the mixture of primary fluid 312 and additive 324 within the mixing area 322. For example, in some embodiments, a slope of the mixing area 322 is in an opposite direction to a slope of the fluid passages 318*a*, 318*b*. The change in direction can encourage swirling of the fluid emerging from the fluid passages 318*a*, 318*b*. Alternatively or in addition, the mixing area 322 can have a larger surface area than the fluid passages 318*a*, 318*b*. Such a change in surface area can also induce swirling. The swirling is sufficient to effectively mix the additive 324 and the primary fluid 312, but is preferably gentle enough to allow carbonation to be substantially retained (e.g. partially or fully retained) within the resulting mixture 332.

In addition, in some embodiments, at least an inner surface of the tray 300 can be hydrophilic. Such a surface can be achieved with a coating, texture, or material of which the tray is composed. The hydrophilic surface can help retain carbonation within the primary fluid flow 312 and/or the resulting mixture 332.

Following the fluid flow from the mixing area 322, the resulting mixture 332 flows towards the outlet nozzle 330 through an exit flow passage 334 defined by at least the partition 316 and the bottom surface 320. In particular, the exit flow passage 334 can be formed in the middle of the u-shaped partition 316 and it can slope downward from the front toward the back of the tray. In some embodiments, the outlet nozzle 330 can be nearer the back wall 308 than the front wall 304. In such embodiments, at least a portion of the bottom surface 320 can be sloped downward from the front wall 304 towards the back wall of the tray 300. That is, a fluid outlet passage 334 is sloped downward from the mixing area 322 to the funnel outlet nozzle 330. As the fluid transitions from the bottom surface into the outlet nozzle 330, the bottom surface can define a smooth transition from the slope directing the resulting mixture 332 towards the outlet nozzle 330. For example, a radius 336 of the transition can be great enough to reduce the likelihood of cavitation, separation, turbulence, or other phenomena that can result in carbonation being released from the mixture. Similarly, all slopes described within this disclosure can be shallow enough to substantially retain (e.g. partially or fully retained) carbonation within the resulting mixture and primary fluid flow throughout the operations described herein. For example, in some embodiments, the slopes can be between 5° and 15°.

The outlet nozzle 330 itself can project downward from the bottom surface 320 to direct fluid into a beverage container, such as the flask 26 (FIG. 1). The nozzle 330, while illustrated as having a circular cross section, can have other cross-sectional shapes, such as an oval or square cross-sectional shape. In some embodiments, one or more support struts 338 can extend across the outlet nozzle 330.

Figure 9:
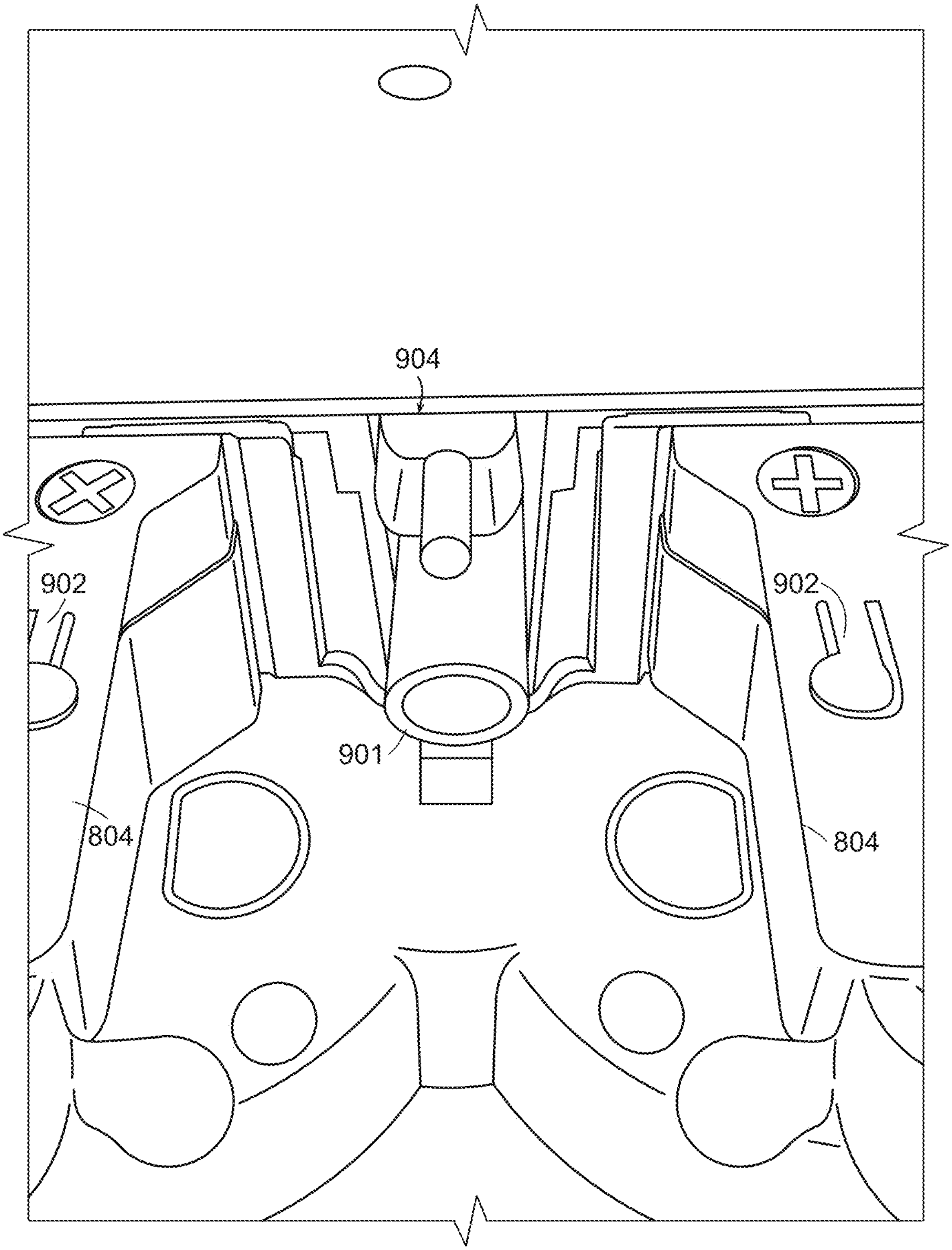
FIG. 9 is a bottom-up perspective view of the carriage of FIG. 8.

These support struts 338 can help provide structural rigidity to the outlet as well as act to straighten the flow of the resulting mixture exiting the funnel 18 through the nozzle. While the present illustrations show three support struts 338, greater or fewer support struts can be used without departing from this disclosure. The nozzle can be of sufficient length to direct the resulting fluid in a substantially downward direction (within) 45°. Alternatively or in addition, the nozzle 330 can have a cross-sectional area large enough to reduce the likelihood of vapor lock, which can release carbonation from the resulting mixture. Alternatively or in addition, the nozzle 330 can have a cross-sectional area similar to that of an outlet 901 of the beverage machine 10 that dispenses the primary liquid (FIG. 9). Alternatively or in addition, the nozzle size can range from 6.5 millimeters to 10 millimeters. In some embodiments, the transition radius 336, nozzle 330 cross section, and nozzle 330 length are all configured to achieve a fill level on the funnel in a front window as a visual show for a user when the funnel 18 is made of a semi-transparent or fully transparent plastic.

Figure 4:
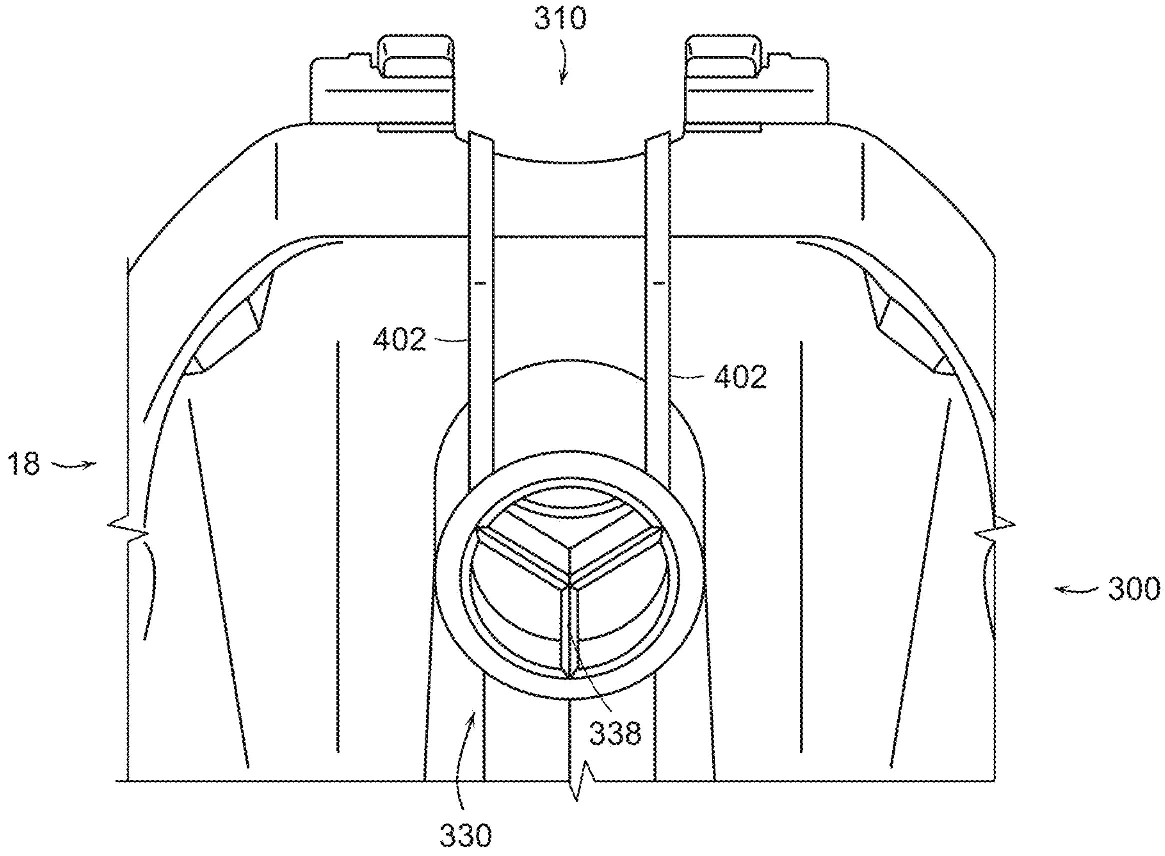
FIG. 4 is a bottom view of a section of the outlet of the mixing funnel of FIG. 3A.

As previously discussed, the nozzle directs a resulting mixture downward, for example, into a drink container. To the extent there are any leaks, the tray 300 can include additional features to direct the leaks into a drink container. FIG. 4 illustrates such a feature. In FIG. 4, wicking ribs 402 extend along an outer surface (back wall 308 and bottom 320) of the tray 300 between the inlet 310 and the nozzle 330. The wicking ribs 402 define smooth surfaces that follow the contours of the tray 300. Surface tension allows any fluid overflow to follow the wicking ribs 402 from the inlet 310 to the outlet nozzle 330 in the event of stray droplets leaking from the inlet 310 to the outside of the tray 300. While two wicking ribs 402 are shown, greater or fewer wicking ribs 402 can be used, for example a single wicking rib 402 or three wicking ribs 402 can be used.

Figure 5:
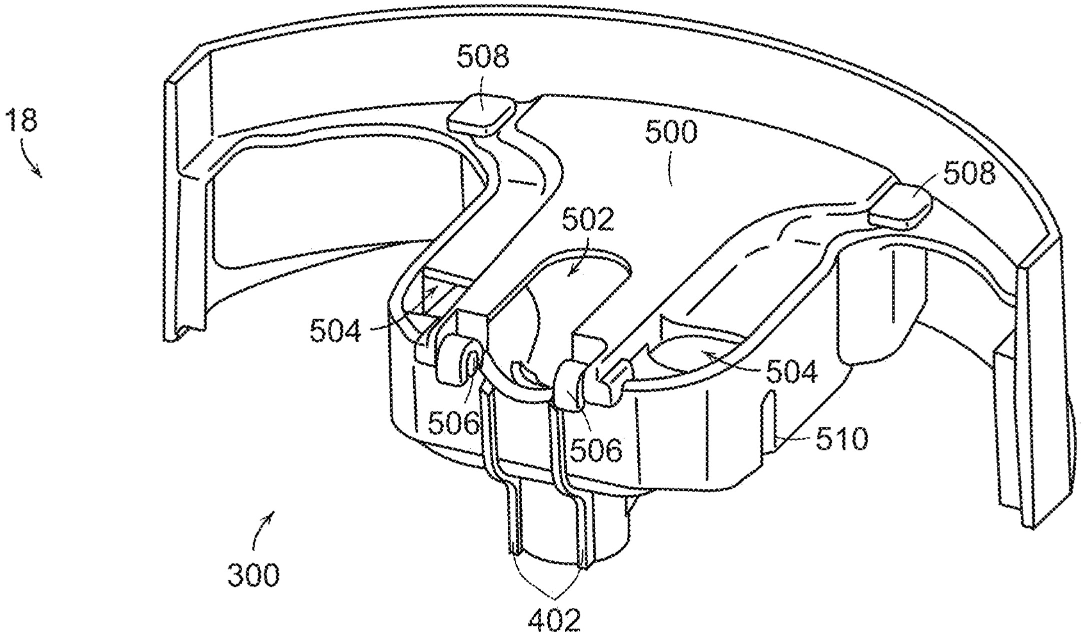
FIG. 5 is a perspective view of the mixing funnel of FIG. 3A having a cover.

While the wicking ribs 402 can be used to mitigate leaks from the tray, other features can be used to better retain fluid within the tray. Such a feature is illustrated in FIG. 5. In the illustrated embodiment, a cover 500 is disposed over the tray 300. In such embodiments, the cover 500 can be attached to the tray with a one or more hinges 506. Alternatively or in addition, the cover 500 can be attached to the tray by snap connections. In some embodiments, the cover can be a removable cover. Removability can improve cleanability of the funnel 18. In some embodiments, tabs 508 are included for a user to manipulate (for example, remove or open) the cover 500. In some embodiments, the cover 500 can be used in lieu of or in addition to the ribs 328 (FIG. 3A).

In embodiments that include the cover 500, the cover can define one or more ports. For example, the cover 500 can define a primary port 502 for providing access to the inlet 310 such that the cover 500 does not block the inlet 310. Alternatively or in addition, the cover can define one or more additive ports 504 for allowing additive to be delivered into the tray. The additive ports 504 can be located above the first flow passage **318*a* and the second flow passage 318*b* (FIG. 3A). Other port locations are possible without departing from this disclosure, for example, in some embodiments, a port can be located over the mixing area 322**.

Figure 6:
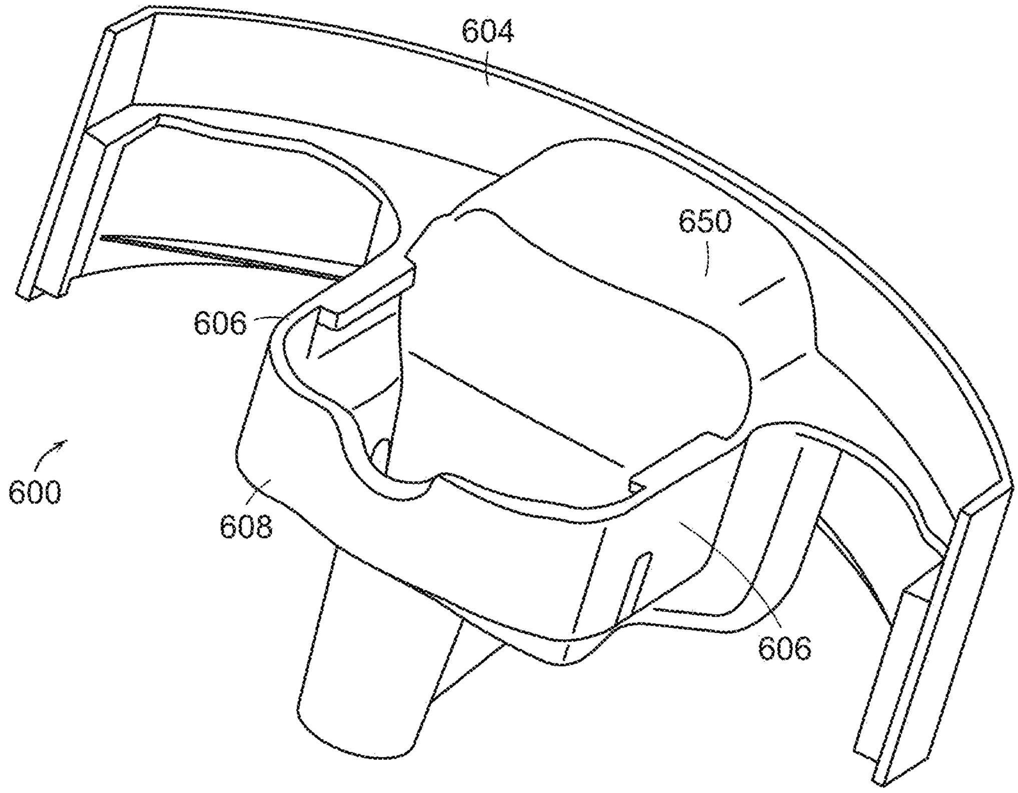
FIG. 6 is a perspective view of one embodiment of a mixing funnel with an integrated splash hood.

In another example of fluid retaining features, as shown in FIG. 6, a splash hood 650 can be integrated into the tray 600. The tray 600 is substantially similar to the embodiments previously described with the exception of any differences described herein. The splash hood 650 can extend from the front wall 604 of the tray 600 towards a back wall 608 of the tray 600. In some embodiments, the splash hood 650 extends between both side walls 606 of the tray 600. The splash hood 650 can extend, for example, 25% to 50% the length of the tray 600. In some embodiments, the splash hood 650 can define a generally convex structure with a rounded or tapered profile. For example, a center part of the splash hood 650 can have a greater length than edges of the splash hood 650 adjacent to the side walls 606. Such a shape reduces the likelihood of interfering with the emitted additives into the first flow passage and the second flow passage (not shown in present view, but substantially similar to flow passages **318*a* and 318*b* previously described). In some embodiments, the splash hood 650 can extend above the tray 600. For example, the splash hood 650 can have a dome-like curve extending above a plane defined by a top of the tray 600. Features described in various embodiments can be combined with one another without departing from this disclosure, for example, an embodiment can include the splash hood 650 and the retaining ribs 402 (FIG. 4**).

Figure 7:
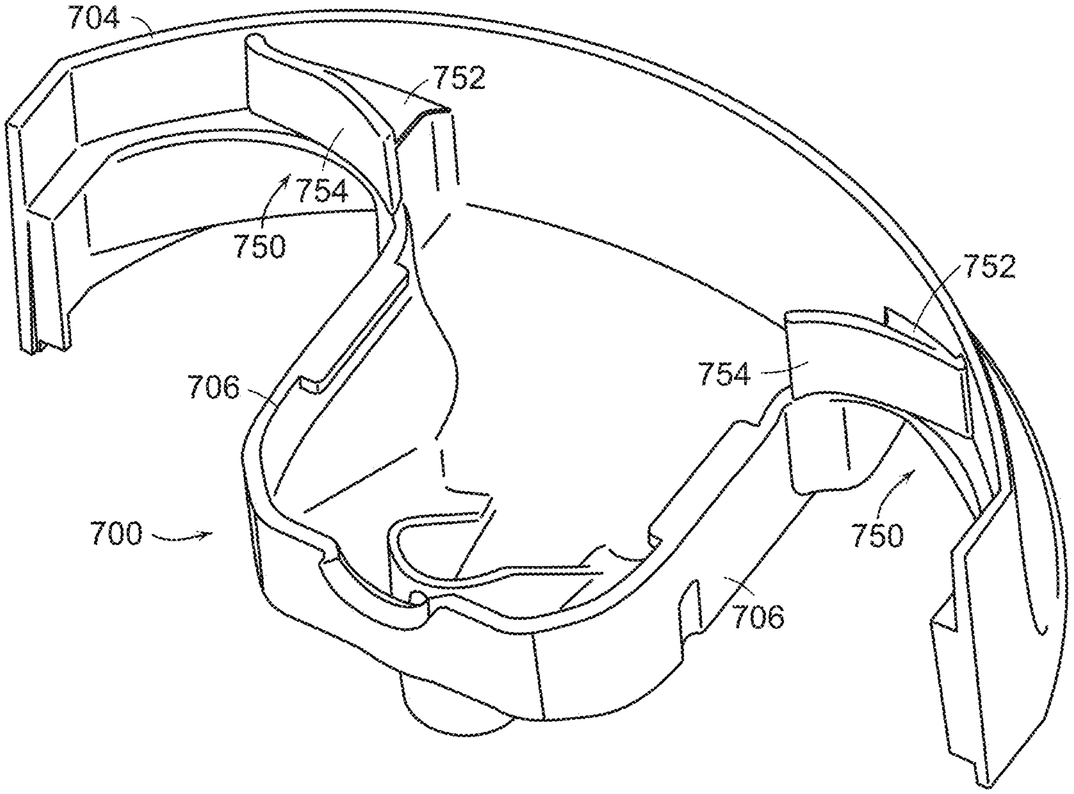
FIG. 7 is a perspective view of one embodiment of a mixing funnel with integrated draining wings.

Alternatively or in addition, draining wings 750, as shown in FIG. 7, can be integrated into the tray 700. The tray 700 is substantially similar to the embodiments previously described with the exception of any differences described herein. The wings extend along the handle 704 past the side walls 706 of the tray 700. The wings 750 act to extend a height of the tray 700 in areas where splashing is likely to occur, for example, during a hard dispense. Each wing includes a wing wall 754 to help retain liquid in such an event. Each wing 750 can define a ramp 752 directing any liquid received during splashing back into the tray 700. In the illustrated embodiment, the wings 750 have a substantially triangular shape; however, other shapes can be used without departing from this disclosure. Features described in various embodiments can be combined with one another without departing from this disclosure, for example, an embodiment can include the wings 750 and the retaining ribs 402 (FIG. 4).

The tray 300, 600 can be made of a variety of materials, for example, plastic, metal, or any other material suitable for food contact. In some embodiments, the funnel can be made of multiple materials, for example, the cover 500 can be made of plastic while the tray (300, 600) can be made of metal.

Figure 8:
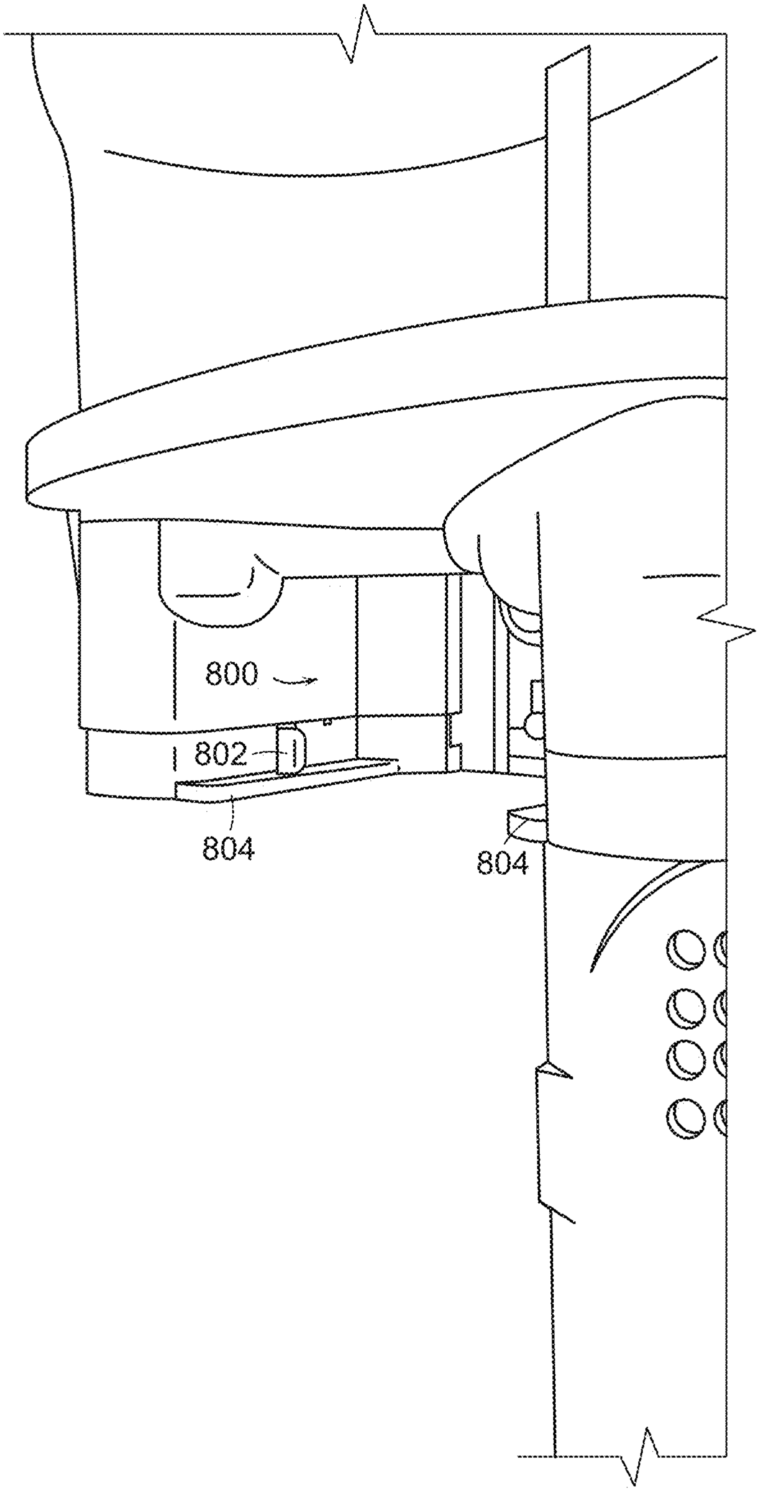
FIG. 8 is a perspective view of a carriage of the beverage dispensing system configured to retain any of the mixing funnels described herein.

The funnel itself can include several features that are arranged to interface with the beverage dispensing system 10. For example, depressions 510 as shown in FIG. 5 can be include that are arranged to mate with one or more corresponding protrusions 802 of the beverage device 10 shown in FIG. 8. In some embodiments, the protrusions 802 can be spring loaded, for example, by a metallic coil spring or by a cantilevered plastic spring 902 as shown in FIG. 9. The beverage device 10 defines a receptacle 800 configured to receive and retain the funnel 18. For example, in some embodiments, the receptacle 800 defines rails 804 upon which the funnel 18 can rest. In operation, the funnel 18 can slide across the rails 804 during insertion and removal. Once installed, the rails 804 can at least partially vertically support the funnel 18. Alternatively or in addition, the funnel can include a protrusion arranged to impact a microswitch 904 shown in FIG. 9 coupled to a controller of the beverage dispensing system 10 that can be used to determine a presence of the funnel. In some embodiments, such a microswitch can be coupled to the spring loaded protrusion 802.

While this disclosure contains many specific embodiment details, these should not be construed as limitations on the scope of what may be claimed, but rather as descriptions of features specific to particular embodiments. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

Other embodiments can be within the scope of the following claims.

What is claimed is:

1. A beverage device, comprising:

a housing having a first outlet configured to emit a primary fluid and at least one secondary outlet configured to emit an additive to be mixed with the primary fluid;

a funnel arranged on the housing to receive the primary fluid through a funnel inlet, the funnel having a partition configured to direct the primary fluid along first and second fluid passages, and the partition defining a fluid outlet path disposed between the first and second fluid passages, the fluid outlet path being configured to direct the primary fluid from the first and second fluid passages to a funnel outlet disposed between the first and second fluid passages, and the funnel being arranged on the housing to receive the additive at a location adjacent to the funnel inlet such that the additive flows with the primary fluid along at least one of the first and second fluid passages and through the fluid outlet path to the funnel outlet.

2. The beverage device of claim 1, wherein the at least one secondary outlet comprises a first secondary outlet configured to emit a first additive and a second secondary outlet configured to emit a second additive, the funnel being arranged to receive the first additive in the first fluid passage and the funnel being arranged to receive the second additive in the second fluid passage.

3. The beverage device of claim 1, wherein the first and second fluid passages are sloped downward from the funnel inlet to a mixing area, the fluid outlet path extending from the mixing area to the funnel outlet.

4. The beverage device of claim 3, wherein the fluid outlet path is sloped downward from the mixing area to the funnel outlet.

5. The beverage device of claim 1, wherein the funnel inlet and funnel outlet are positioned at a rear portion of the funnel, and the first and second fluid passages extend from a rear portion to a front portion of the funnel.

6. The beverage device of claim 1, wherein an interior surface of the funnel is hydrophilic.

7. The beverage device of claim 1, further comprising at least one wicking rib extending between the funnel inlet and the funnel outlet along an outside of the funnel.

8. The beverage device of claim 1, further comprising a handle extending along an outer portion of the funnel.

* * * * *